US012232232B2

(12) United States Patent
Spiro

(10) Patent No.: US 12,232,232 B2
(45) Date of Patent: *Feb. 18, 2025

(54) ENVIRONMENTAL HAZARD RISK MITIGATION SYSTEM, METHOD AND COMPUTER PROGRAM PRODUCT IN URBAN AND SUBURBAN ENVIRONMENTS

(71) Applicant: Lighting Defense Group, LLC, Scottsdale, AZ (US)

(72) Inventor: Daniel S. Spiro, Scottsdale, AZ (US)

(73) Assignee: LIGHTING DEFENSE GROUP, LLC, Scottsdale, AZ (US)

( * ) Notice: Subject to any disclaimer, the term of this patent is extended or adjusted under 35 U.S.C. 154(b) by 108 days.

This patent is subject to a terminal disclaimer.

(21) Appl. No.: 18/084,589

(22) Filed: Dec. 20, 2022

(65) Prior Publication Data

US 2023/0116939 A1 Apr. 20, 2023

Related U.S. Application Data

(63) Continuation-in-part of application No. 17/334,722, filed on May 29, 2021, now Pat. No. 11,565,597.
(Continued)

(51) Int. Cl.
*H05B 47/105* (2020.01)
*F21S 8/08* (2006.01)
(Continued)

(52) U.S. Cl.
CPC .......... *H05B 47/105* (2020.01); *F21S 8/086* (2013.01); *F21V 23/0442* (2013.01); *F21V 23/06* (2013.01); *F21V 29/74* (2015.01);
*H01F 27/24* (2013.01); *H01F 27/2804* (2013.01); *H01F 41/02* (2013.01); *H01F 41/041* (2013.01); *H04W 88/08* (2013.01); *H05B 45/10* (2020.01); *H05B 47/19* (2020.01); *H05K 1/0298* (2013.01); *H05K 1/115* (2013.01); *H05K 1/181* (2013.01);
(Continued)

(58) Field of Classification Search
CPC .. H05B 47/105; G08B 19/005; G08B 29/185; G08B 25/008
See application file for complete search history.

(56) References Cited

U.S. PATENT DOCUMENTS 6,307,330 B1 10/2001 So
RE38,767 E 8/2005 Wedell et al.
(Continued)

FOREIGN PATENT DOCUMENTS

CN 202617435 U 12/2012
CN 203352881 U 12/2013
WO 2015/193059 A1 12/2015

*Primary Examiner* — Mirza F Alam
(74) *Attorney, Agent, or Firm* — XSENSUS LLP

(57) ABSTRACT

A network of Intermediate Device Structure (IDS) members communicatively coupled, mounted to elevated structure/s within urban settings, each configured to operate by a processor/controller with resident code, and in real time receive sensed environmental inputs from each IDS' vicinity, remote data/instruction/s processing the inputs with resident code parameters generating outputs that are configured to mitigate/avert intermittent environmental events harmful/hazardous to humans.

20 Claims, 13 Drawing Sheets

Related U.S. Application Data which is a continuation-in-part of application No. 16/841,399, filed on Apr. 6, 2020, now Pat. No. 11,071,204, which is a continuation-in-part of application No. 16/242,666, filed on Jan. 8, 2019, now Pat. No. 10,653,014, which is a continuation of application No. 15/884,107, filed on Jan. 30, 2018, now Pat. No. 10,215,351, which is a continuation of application No. 14/757,923, filed on Dec. 28, 2015, now Pat. No. 9,885,451, which is a continuation-in-part of application No. 14/166,056, filed on Jan. 28, 2014, now Pat. No. 9,829,185.

(60) Provisional application No. 61/767,035, filed on Feb. 20, 2013.

(51) Int. Cl.

| | |
|---|---|
| *F21V 23/04* | (2006.01) |
| *F21V 23/06* | (2006.01) |
| *F21V 29/74* | (2015.01) |
| *H01F 27/24* | (2006.01) |
| *H01F 27/28* | (2006.01) |
| *H01F 41/02* | (2006.01) |
| *H01F 41/04* | (2006.01) |
| *H04W 88/08* | (2009.01) |
| *H05B 45/10* | (2020.01) |
| *H05B 47/19* | (2020.01) |
| *H05K 1/02* | (2006.01) |
| *H05K 1/11* | (2006.01) |
| *H05K 1/18* | (2006.01) |
| *F21W 131/103* | (2006.01) |
| *H05B 47/195* | (2020.01) |
| *H05K 1/16* | (2006.01) |

(52) U.S. Cl.
CPC ..... *F21W 2131/103* (2013.01); *H05B 47/195* (2020.01); *H05K 1/0233* (2013.01); *H05K 1/165* (2013.01); *H05K 2201/086* (2013.01); *H05K 2201/0929* (2013.01); *H05K 2201/1003* (2013.01); *Y02P 70/50* (2015.11); *Y10T 29/49117* (2015.01); *Y10T 29/4913* (2015.01)

(56) References Cited

U.S. PATENT DOCUMENTS

| | | |
|---|---|---|
| 7,893,848 B2 | 2/2011 | Chew |
| 8,475,002 B2 | 7/2013 | Maxik et al. |
| 9,960,929 B2 * | 5/2018 | Fadell .................... F24F 11/523 |
| 10,653,014 B2 * | 5/2020 | Spiro .................... H05K 1/0298 |
| 2007/0109142 A1 | 5/2007 | McCollough, Jr. |
| 2012/0038281 A1 * | 2/2012 | Verfuerth ............... H05B 45/10 |
| | | 315/152 |
| 2012/0038490 A1 * | 2/2012 | Verfuerth ................. G08G 1/04 |
| | | 340/917 |
| 2012/0323643 A1 | 12/2012 | Volz |
| 2014/0035526 A1 | 2/2014 | Tripathi et al. |
| 2014/0072178 A1 | 3/2014 | Carbonell et al. |
| 2015/0109128 A1 * | 4/2015 | Fadell .................. G08B 25/008 |
| | | 340/540 |
| 2015/0116108 A1 * | 4/2015 | Fadell .................. G08B 27/003 |
| | | 340/501 |
| 2017/0270795 A1 | 9/2017 | Vaidyanathan |
| 2019/0088128 A1 | 3/2019 | Adireddy et al. |

* cited by examiner

ENVIRONMENTAL HAZARD RISK MITIGATION SYSTEM, METHOD AND COMPUTER PROGRAM PRODUCT IN
URBAN AND SUBURBAN ENVIRONMENTS

CROSS-REFERENCE TO RELATED APPLICATIONS

The present application is a continuation-in-part of and claims priority to U.S. patent application Ser. No. 17/334,722, filed May 29, 2021, which is a continuation-in-part of and claims priority to U.S. patent application Ser. No. 16/841,399, filed Apr. 6, 2020 (now U.S. Pat. No. 11,071,204); which is a continuation-in-part of and claims priority to U.S. patent application Ser. No. 16/242,666, filed Jan. 8, 2019 (now U.S. Pat. No. 10,653,014); which is a continuation application of and claims priority to U.S. patent application Ser. No. 15/884,107, filed Jan. 30, 2018 (now U.S. Pat. No. 10,215,351); which is a continuation application of U.S. patent application Ser. No. 14/757,923, filed Dec. 28, 2015 (now U.S. Pat. No. 9,885,451); which is a continuation-in-part application of and claims priority to U.S. patent application Ser. No. 14/166,056, filed Jan. 28, 2014 (now U.S. Pat. No. 9,829,185); which in turn claims the benefit of the earlier filing date of U.S. Provisional Application No. 61/767,035, filed Feb. 20, 2013, and incorporates by reference each of the above applications/patents in their entireties. To the extent any amendments, characterizations, or other assertions previously made (in this or in any of the above-cited patent applications and/or patents) with respect to any art, prior or otherwise, could be construed as a disclaimer of any subject matter supported by the present disclosure of this application, Applicant hereby rescinds and retracts such disclaimer. Applicant also respectfully submits that any prior art previously considered in any related patent applications or patents, including any parent, sibling, or child, is expected to be revisited by the Office as part of the examination of the subject application.

BACKGROUND

Technical Field

The present disclosure relates to systems and methods that detect "black ice" on pathways (e.g., roads, or footpaths) traversed by any of motor vehicles (automobiles, motorcycles, motorized skateboards and the like), manually powered vehicles (e.g., bicycles, skateboards, etc.), or pedestrians.

Discussion of Background

In this context "black ice" is a thin frozen film that forms on the pathway when the temperature of the moisture on the pathway drops below its freezing point. The same phenomenon occurs when a pond is exposed to cold air, and a thin sheet of water freezes on the surface of the pond. When black ice along a pathway, it poses hazards to humans and machines. Black ice receives its name because many roadways are made of black asphalt, and thus the thin, transparent layer of ice appears black.

Black ice is a major contributor nationally to bodily injury and vehicular damage. Today, black ice occurrence is not always predictable; it is transient and it may come and go several times in the course of a day or night, depending on ground temperature, air temperature, and the chemical makeup of moisture on the road.

Specialized technology exists to alert drivers of the presence of black ice once it is detected. However, as recognized by the present inventor, this technology is not commonplace, and is most commonly sold with high end contemporary vehicles. Furthermore, it is inherently limited in its ability to self-detect black ice due to various factors including angle of incidence for line-of-sight visual path from the vehicle to the roadway, lighting, as well as vehicle speed as it approaches an area that may have black ice. This conventional technology is based on sensors that are relatively close to the roadway and so the field of visibility is limited as well as the angle of incidence and reflection angle. Moreover, it is important to detect the black ice before the vehicle is on it, and so the sensors are oriented to observe a space on the roadway in front of the vehicle. However, the geometry of the sensors (positioned on the vehicle at a relatively low height, such as 2 or 3 feet above the road surface) as well as being oriented to detect black ice in front of the vehicle, in combination with the vehicle's relative speed may not allow sufficient time for system to generate an alert, nor for the driver to response to the alert once it is generated. Due to these tight time constraints and geometrically disadvantaged sensor placement, these system are forced into a suboptimal tradeoff of high probability of detection vs. high probability of false alarm. A system that is limited based on poor visual angle from the vehicle to the black ice, and high travel speed would either by optimized for (1) high probability of detection with corresponding high false alarm rate and high alert rate, or (2) lower probability of detection with lower false alarm rate (and lower alert rate), but higher associated risk of vehicle sliding due to failure to detect the black ice and/or failure to react to the black ice in a timely manner.

SUMMARY

According to an aspect of the present disclosure, a new network of intermediate device system members (IDS members) is described. Each IDS member is coupled to a pole structure electrically connected to a power source, such as those described in U.S. application Ser. No. 17/334,722. The pole structure hosts the IDS member with a local input device, resident memory storing AI code (and/or an a communication interface to remote device or system, such as a cloud computing resource that hosts a trained AI engine), a processor, an output device, a bi-directional communication circuitry and a communicatively coupled auxiliary sensing device that is configured to sense an environmental parameter of an area surrounding the intermediate device system, was well as a control unit communicatively coupled to the processor and a vehicle. The auxiliary sensing device includes an image sensor (e.g., still camera or video camera). The field of vision of the image sensor covers a defined portion of a pathway (e.g., road, or foot path). The field of vision of the image sensor is configured to overlap with other neighboring IDS members. The image sensor has at least one filter configured to detect an environmentally adverse roadway condition The input received from the image sensor by the processor is analyzed by code programmed to identify the presence of black ice when it exists. Under a condition that black ice is detected or when the code decides that black ice presence is imminent, the IDS member's transceiver in real time alerts at least one of: an oncoming vehicle, an oncoming pedestrian, a neighboring IDS member, and a municipal/county department about the presence of black ice.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein.

DETAILED DESCRIPTION

Figure 1:
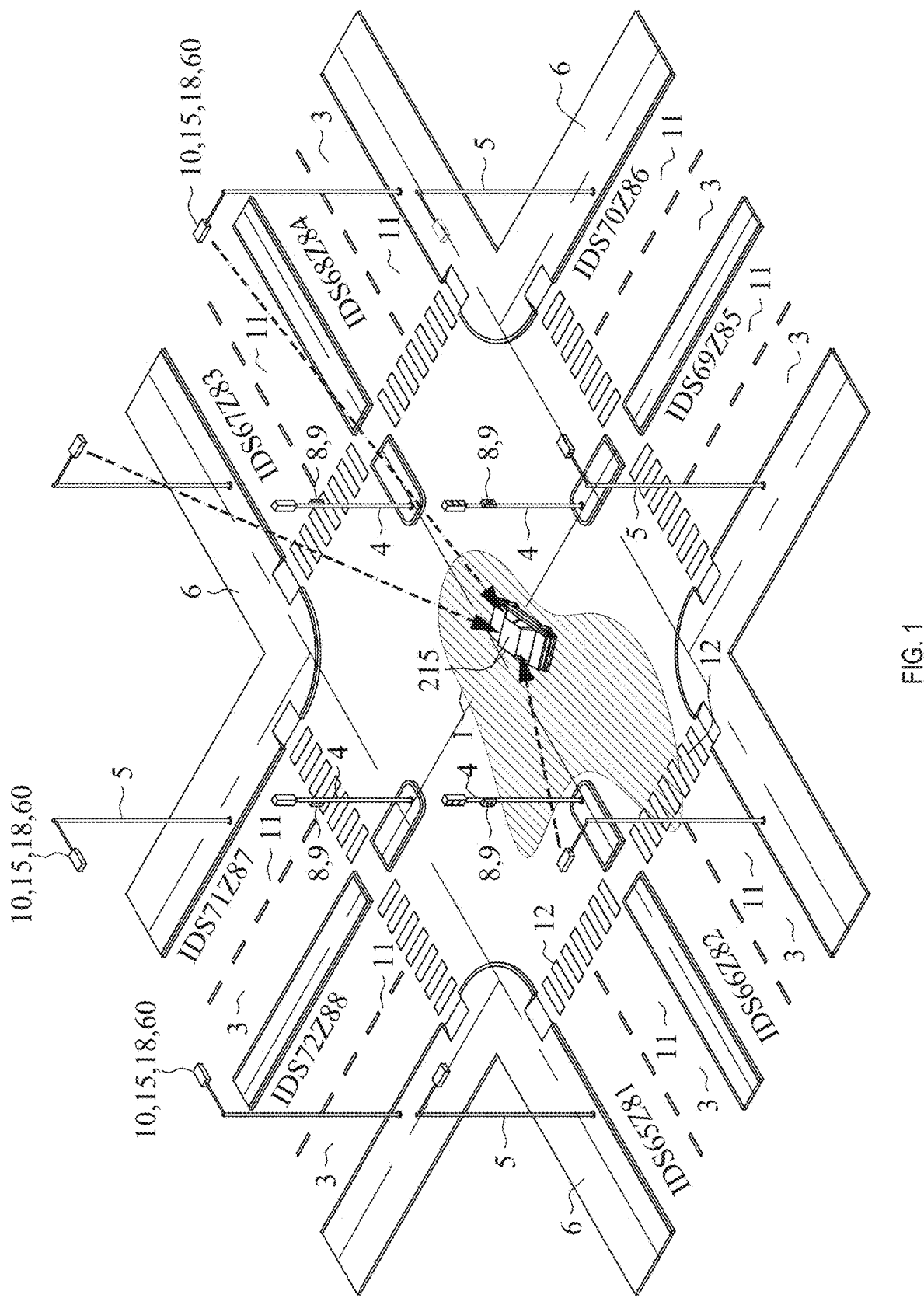
FIG. 1 is a perspective view of an intersection with traffic signal poles surrounded by a plurality of pole mounted IDS members and a vehicle passing through a patch of black ice.

As used herein, an element or step recited in the singular and proceeded with the word "a" or "an" should be understood as not excluding plural elements or steps, unless such exclusion is explicitly recited. Furthermore, references to "one embodiment" of the present disclosure are not intended to be interpreted as excluding the existence of additional embodiments that also incorporate the recited features.

Before addressing each figure individually, a brief overview of an Intermediate Device Structure (IDS) network is provided. The IDS network is an urban infrastructure device solution comprising a community of like members configured to make living in the city safer, healthier, and friendlier. The IDS members are communicatively coupled and distributed throughout the public domain of a city. The IDS community members can also be communicatively coupled to at least one remote client. The IDS members can communicate with at least one: an individual and/or his or her mobile device, a stationary or moving vehicle, a municipal department, a banking/credit institution, and cloud computing resources, as will be discussed. Examples of IDS members used in a network are found in the patent documents cited in the Cross-Reference Section, for example U.S. Pat. No. 11,071,204. However, the IDS member described herein has modified functionality to provide the functions and services as discussed herein.

The IDS member is coupled to an elevated structure that has or can have access to electricity. The elevated structures can include roadway lighting poles, traffic light poles, walls, power poles, and building exteriors. Coupling the IDS member to vertical structures well above grade enables greater area coverage to coupled sensing and communication devices, as well as providing a better vantage point to capture images with an image sensor which are used in black ice detection. Also, mounting IDS members well above the ground reduces risk of damage, tampering or theft.

Roadways constitute the majority of the city's public domain. Therefore, the IDS members can be primarily placed on roadway lighting and traffic lighting poles. These poles are electrified and the spacing between the poles is regulated, leaving no gaps that would otherwise require installing vertical structures to support the IDS members. The IDS member can incorporate the utility of the device/s originally coupled to the pole or can operate independently.

The IDS member's electronic devices can include at least one of: a processor/controller with resident memory and code, a sensing device, a communication device, a back-up power storage device, and an output device. Each of the IDS' networked members is tasked to gather in real time environmental inputs around the vicinity of the IDS member. Using sensing devices (e.g., image sensors, ground and air temperature sensors, humidity sensors, light sensors and the like) the information is received by the IDS' processor/controller. The sensing devices can be coupled to at least one of: the IDS' member housing, the pole/arm, and to a surface in the vicinity of the pole.

The sensing devices can include: a camera (which at least includes an image sensor and optics, and which can be a still camera or a video camera), a photocell, a temperature probe, a barometric pressure probe, a vibration sensor, a speaker/microphone, a light source, a wind velocity probe, an air quality probe, a radiation sensor, radar, a sound meter and any other sensing device that, operating alone and/or with other coupled sensing devices, enhances the utility derived from the IDS member.

The processor/controller of the IDS member is configured to receive and process a plurality of inputs in real time. The inputs are received from sensory devices associated with the IDS member, neighboring like IDS members and other remote clients. The IDS member can have a unique address and the associated sensing, communicating, output, and power back-up storage devices can be associated by a sub-address. Similarly, other remote IDS members, their devices, as well as remote clients have their own unique addresses and sub-addresses. Unique addresses of IDS member devices enable geographic mapping of the IDS' member community.

The code operating the processor/controller of the IDS member is configured to operate alone and/or in unison with another networked member. The code can employ at least one artificial intelligence (AI) algorithm embodied as a trained AI engine, as will be discussed in more detail with reference to FIGS. 11, 12 and 13. AI algorithm modules that can provide I/O and/or control an IDS member include at least one of: a learning and a predictive algorithm module. The inputs received by the AI code can include sensory input that can perceived by humans, and other inputs beyond human perception.

The inputs received by the devices associated with the IDS member coupled with inputs received from like IDS neighboring members and other remote clients is compiled by the code's pre-programmed parameters to generate accurate and consistent outputs based on the same sets of inputs. The outputs can be preemptive or reactive. The IDS community of networked members' prime responsibility is to protect life. Applicant's prior U.S. Pat. Nos. 9,829,185; 9,885,451; 10,215,351; 10,653,014; and 11,071,204, each of which is incorporated herein by reference in its entirety, articulate several utility use cases.

The present embodiments describe, among other things, use cases where an IDS member can protect life under intermittent environmentally hazardous conditions. In this case, a phenomenon known as black ice is occasionally unpredictable. Knowing when such events materialize is critical to preserving life.

With reference to FIG. 1, at least one black ice sensing device 18 is/are mounted to vertical structure/s well above a vehicles' height 215. Along roadways 3, the sensing device/s 18 is/are coupled to the IDS member 10. The sensing device/s 18 can also couple to roadway lighting poles 5 and traffic light poles 4 that support the IDS member 10. The electrified roadway lighting poles 5 and traffic light poles 4 enable placing the IDS member 10 sufficiently high for the sensing device/s 18 (e.g., imaging devices such as cameras, and air temperature sensors) to have full coverage of roadways 3 and/or pedestrian 100 pathways. It should be noted that other sensors such as temperature and/or humidity sensors may be placed near, or at, the bottom of the poles 5/4, or adjacent to the road surface, so as to obtain sensor data in the micro region around a the surface of the road.

In Applicant's prior patents (cited above), the disclosures describe a camera 60 (the camera 60 may capture video images as well as, or in addition to, still images) communicatively coupled to an IDS member's 10 processor/controller. The camera 60 has an assigned a field of coverage referred herein as a zone section 11. In some cases, the field of coverage can overlap other neighboring IDS members' 10 fields of coverage. Together, the cameras communicatively coupled to the community of IDS members 10 have full coverage of roadways 3 and/or pedestrian 100 pathways. The coverage also includes stationary and mobile objects such as vehicles 215 and pedestrians 100.

These earlier patents further taught that the processor/controller can be taught to pixelize its field of vision to discern anomalies from the expected field of coverage. The camera 60 communicatively coupled to the IDS member 10 can have at least one filter that filters refracted light in the visual and non-visual spectrum to humans. The input (e.g., image data, as well as optional position, and time stamp data) captured by the camera 60 is processed through at least one of: the camera's 60 image processor and/or the processor/controller of the IDS member 10, so as to detect when black ice 1 has formed or will soon form. The camera 60 of the IDS member 10 can operate 24 hours a day, 7 days per week, recording and processing the same field of coverage day and night in all seasons. The data gathered is then stored by each IDS member 10 corresponding to the IDS member's 10 zone section 11 location. The IDS member 10 employs code to determine a change in refracted or reflected light properties at the surface of the roadway to detect or anticipate black ice that forms under a myriad of climatic conditions associated with seasonality and time of day. The refracted and reflected light properties are collected and stored in a relational database that includes associated values of temperature, humidity, ambient light level, refracted or reflected light level, change in refracted or reflected light level over a predetermined period of time (e.g., 10 seconds, 1 minute, 10 minutes), and optionally whether black ice under similar past data recordings. As will be discussed in reference to FIGS. 11-13, the IDS members processor may also employ a trained AI engine to assist in detecting presence of black ice 1. The amount of reflectivity change is in a range of 5% to 10%, although both the lower end and upper end are adjustable within a range of 1% to 20%.

The gathered data coupled with communicated input from neighboring IDS members 10 and remote client/s are compiled with local resident code program parameters to generate at least one output. The code may employ at least one AI algorithm, enhancing the IDS member's 10 ability to identify and alert detection of black ice 1. The AI code can include input from at least one additional sensing device 18 other than the camera 60, discerning the presence of, or the imminent possibility for black ice 1 to form. For example, the IDS member 10 processor/controller receiving input from the camera 60 may have observed water ponding along the path of vehicular 215 travel. A temperature probe communicatively coupled to the IDS member 10 processor/controller AI code tasked with monitoring fluctuations in the ambient air temperature provides data in real time of descending ambient temperature. With these two input parameters, the AI code can predictably decide that the presence of black ice 1 is imminent. In such cases, the AI code sends an alert to "need-to-know" clients (other electronic entities that are part of the IDS member network, including devices serviced by the IDS member network) in advance of the icing event. In another example, an audio device 8 and/or a light source 9 communicatively coupled to a traffic light pole 4 and/or to a roadway lighting pole 5 with coupled IDS member 10 in the vicinity of a pedestrian 100 crosswalk 12 can alert pedestrians of anticipated or present black ice 1 in the crosswalk 12, and take appropriate measures to issue warning signals that trigger an audio, visual, and/or tactile alert for the pedestrian or a mobile device carried by the pedestrian.

The AI code may employ a learning module. Every time it records an event, the AI code extracts pertinent data points to help the code to at least become more efficient in predicting and/or identifying the presence of black ice 1.

The networked community of the IDS members 10 communicates with one another on a programmed "need-to-know" basis. Since each IDS member's 10 geographic location is known, through cross-communication between the IDS members 10, humans and machines can become aware of black icing 1 events long before arriving at the specific location of the black ice 1. For example, at least one IDS member 10 identifies an imminent black icing 1 event about to occur in a specific location along its field of coverage (Zone section 11). The IDS member 10 immediately communicates the imminent event to neighboring IDS members 10. The neighboring IDS members 10 identify vehicles 215 and/or pedestrians 100 traveling in the direction of the black ice 1 location, and by means of wireless and/or audio, alerts vehicles 215 and/or pedestrians 100 respectively.

Since the icing event location is known, and the vehicle/s 215 alerted is/are known, the vehicles' 215 distance to the black ice 1 location can be configured in real time, letting the vehicle/driver know the distance to the location and signaling "all clear" once the vehicle 215 passes the black ice 1 location. As will be discussed, once alerted, the vehicle may also serve as a detecting resource by controlling an illumination source and image capture device on the vehicle that is oriented under the vehicle to detect the presence/absence of black ice from a very close distance (e.g., 1 to 3 feet depending on the mounting height of the illumination source and image capture device on the vehicle). The vehicle 215 can thus confirm the presence (or absence) of black ice at very precise positions along the roadway, and share that information with the closest IDS member, or other device in the IDS member network such as another vehicle or a roadside device (RSD) via V2V or more generally V2X communication. Moreover, in this context the vehicle 215 does not perform the detection for its benefit because it detects the black ice 1 while the vehicle 215 is over top of the black ice 1. However, the close-up detection of black ice 1 by the vehicle 215 provides highly accurate data that is shared with the IDS member network for the benefit of other vehicles or pedestrians who pass over the same section of pathway, which has black ice 1 that is present on it. Similarly, the vehicle 215 is equally instrumental in confirming that the black ice 1 is absent when conditions have changed and the black ice 1 returns to liquid or vapor form.

Once an alert condition is triggered, at least one municipal/county department can be alerted. The benefits of such an alert can include:
Assessment where roadway/crosswalk 3,12 repair is needed
Placing emergency staff and equipment on alert
Adding to code data such as traffic volume along any zone section 11 of a roadway 3 governed by an IDS member 10 and the corresponding frequency of accidents within the zoned section 11 can help decision makers determine the priorities of maintenance and repair work to avoid accidents caused by at least black ice 1.

The means of communicating with vehicles 215 can be different from the means of communicating with municipal/county and/or pedestrian 100 clients. The communications industry has developed a wireless standard V2V and more generally V2X (V2V is a subset of V2X) communication standard used for wireless communications with moving vehicles, and V2X can be adopted by the network of the IDS members' 100 community. A different protocol can be used as well for communicating with municipal/county departments. Since proximity and/or speed do not factor when it comes to pedestrian 100 travel, public audio and/or visual devices 8,9 can be sufficient to alert pedestrians 100 in the vicinity of a black ice 1 presence.

FIG. 1 is a perspective view of a four-way intersection with a portion of its surface covered by black ice 1. Inside the intersection four traffic light poles 4 shown control vehicular and pedestrian 100 traffic. Along the roadways 3 leading to the intersection 7, a plurality of roadway lighting poles 5 are configured to illuminate the roadways 3, intersection 7, and sidewalks 6.

FIG. 1 shows a surface area, within the intersection 7 identified by at least one IDS member 10, to be covered by black ice 1. The area is shown by an enclosed irregular oblong shape with diagonal lines across. Also shown is a vehicle 215 making a left turn through the intersection 7 traveling over the patch of the black ice 1. The IDS members 10 are coupled to the roadway lighting poles 5, usually at a height of more than 20 feet, which gives the IDS members 10 an excellent vantage point for observing the pathways. At least one sensing device 18 is communicatively coupled to the IDS member 10. The sensing device 18 such as a camera 60 can couple to the IDS member housing 15 and/or a section of the pole 2 section. In addition, a device coupled to a nearby pole 2, like a traffic light pole 4, can be remotely controlled by an IDS member 10.

Each of the coupled IDS members 10 is associated with a specific geographic zone section 11 of the roadway 5 and/or the intersection 7. The sensing device/s 18 coupled are configured to know each pixelated area of the zone section 11 assigned to their IDS member 11 to oversee and manage. Each of the IDS members 10 has a unique address and the IDS member 10 associated coupled devices are assigned a sub-address of the IDS member 10.

FIG. 1 shows the entire area of the four-way intersection 7 and the roadways 3 leading to the intersection 7 zoned by sections 11. Each of the zone sections 11 is also associated with a specific IDS member 10 device tasked with at least one functionality of: monitoring, recording, managing, and alerting. The zone section 11 shown can include the IDS member 10 number and the associated zone section 11, i.e., IDS65Z81. The patchwork of all zones provides 24/7 coverage over the entire city roadway system.

FIG. 1 shows lines of vision (lines of sight) extending from the pole 2 coupled IDS member 10 to a vehicle 215 passing through the intersection 7. These lines represent the sensing device 18 of the IDS member 10 tracking a vehicle 215 driving over a patch of black ice 1. At this point of travel both the driver and the vehicle 215 are most vulnerable to an accident. In some jurisdictions, at least one operation by the vehicle 215 may be controlled by an IDS member 10 when a vehicle 215 advances toward a road impediment such as a patch of black ice 1.

The IDS members 10 shown separately and/or jointly can continuously monitor the size and shape of the black ice 1 patch and can relay the information automatically in real time and/or when requested to mobile and stationary clients. The sensing devices 18 identifying a black ice 1 patch location can have multiple utility. These devices can sense in real time man-made and natural environmental phenomena. At least one of the sensed inputs can be beyond human perception.

The key utility derived from the IDS member 10 community as shown in FIG. 1 is the networked system's ability to give humans and machines real time advance warning of intermittent events that are about to happen and enough time to prepare for, in the present use case an adverse road condition ahead.

Figure 2:
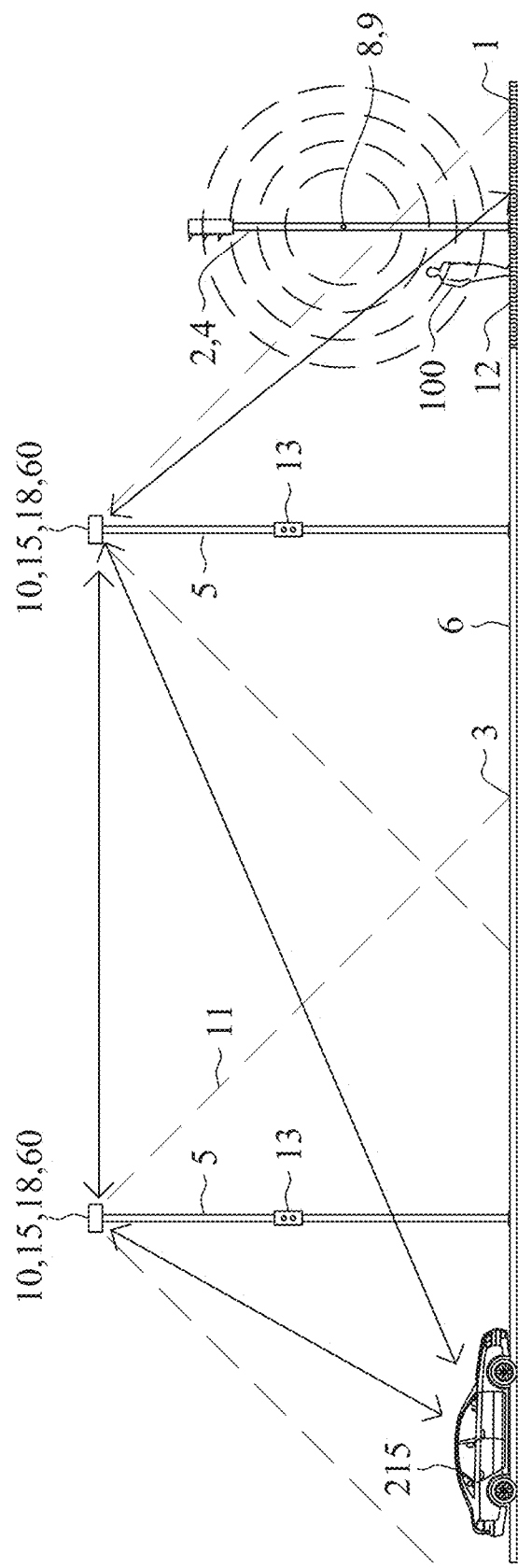
FIG. 2 is an elevation view of a street with IDS members coupled to roadway lighting poles communicating with a vehicle and a pedestrian in the vicinity of an area with black ice.

FIG. 2 shows an elevation of a roadway 3 with IDS members 10 coupled to roadway lighting poles 5 communicating with a vehicle 215 and a pedestrian 100 in the vicinity of an area with black ice 1. Two poles 2, each with an IDS member 10 coupled, are shown ahead of the direction the vehicle 215 travels toward. At the poles' 2 middle section, a coupled signaling device 9 such as a light source 13 is configured to visually alert drivers when approaching a location identified to be covered by black ice 1. The signaling devices 9 can be controlled by the IDS member' 10 processor/controller of the roadway pole 5 they are coupled to.

At the opposite end of the elevation, a traffic light pole 4 is shown with a pedestrian 100 crossing the roadway 3 at a crosswalk 12. An audiovisual device 8, 9 coupled to the traffic light pole 4 can be configured to alert pedestrians 100 when black ice 1 cover has been detected along a crosswalk 12. The audio device 8 and/or a light source 9 can be controlled by an IDS member 10 coupled to the traffic light pole 4, or a nearby IDS member 10 coupled to a roadway lighting pole 5. The audio alert can be one of a plurality of audio messages communicated by an IDS member 10 processor/controller managing pedestrian 100 traffic in a crosswalk 12.

FIG. 2 shows two lines extended between the two roadway lighting pole mounted IDS members 10 and the approaching vehicle 215. These lines represent communication connectivity between the IDS members 10 and at least one vehicle 1. The communication can be single or bi-directional. It is noted that as an example, the present figure V2V (or V2X) communication protocol can be adapted to communicate between pole mounted IDS members 10 and a vehicle 215.

Of the two roadway lighting poles 5, the IDS member 10 pole 2 shown closer to the black ice 1 patch displays a direct line to the center of the black ice 1 patch and another direct line to the pole 2 positioned next to the approaching vehicle 215. The IDS member 10 coupled to the pole 2 closer to the black ice 1 patch maintains constant surveillance of the black ice 1 patch and on an "as needed" basis communicates the condition to the neighboring IDS member 10 coupled to the pole 2 in the vicinity of the vehicle 215.

As a vehicle 215 nears the black ice 1 patch, it can be configured to communicatively interact with the IDS member 10 closest to the black ice patch 1. Addressing roadway mitigation of roadway hazards, an onboard dashboard display inside the vehicle can inform the driver of the distance to the black ice patch, the patch configuration, and when the vehicle has cleared the black ice 1 patch.

Figure 3:
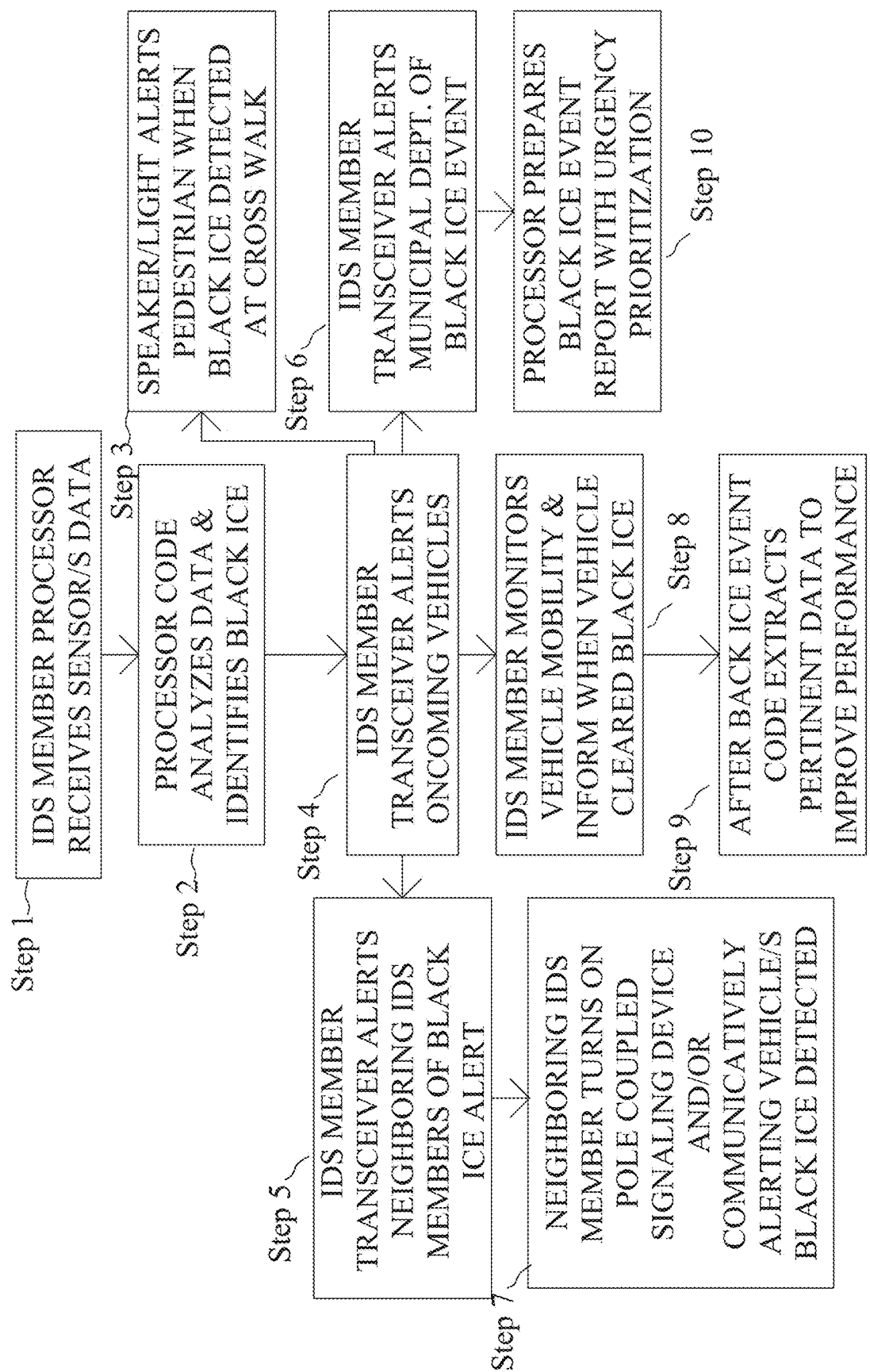
FIG. 3 is a flowchart that depicts one example of a process implemented by the IDS member when detecting or predicting a black ice event.

FIG. 3 shows a functional block diagram that depicts one example of the IDS member process logic when detecting or predicting a black ice event. The processes are shown in a stepwise format.

Step 1—The IDS member sensing device/s sends a data set to the processor/controller.

Step 2—The processor/controller processing the data set identifies the presence of black ice at a specific zone section, or that it is imminent that black ice will be formed at a specific zone section within a time window.

Step 3—The IDS member sends an audio, a visual, or an audio/visual alert to pedestrian/s if they are in the vicinity of the black ice event.

Step 4—The IDS member sends electronic alert/s to oncoming vehicles.

Step 5—The IDS member sends electronic alert/s to neighboring IDS network members. The alert can identify the exact location of the zone section and the icing patch size.

Step 6—The IDS member sends electronic alert/s to municipal/county department/s identifying the section zone and the icing patch size.

Step 7—Neighboring IDS members turn on their signaling device such as a light source coupled to a pole, configured to alert oncoming drivers to the presence of black ice patch/es ahead. Vehicles communicatively coupled to the pole mounted IDS member receive in real time at least one data point on the specific zone section location of the black ice patch. The data points can include the black ice patch size and distance to the ice patch.

Step 8—The alerting IDS member and/or neighboring member/s (when the black ice patch extends over a plurality of zone sections) monitor vehicle/s until the vehicle/s clear the location of the black ice patch. Vehicle/s communicatively coupled to the IDS member can be notified once the vehicle/s have cleared the black ice patch.

Step 9—After the black ice has been removed/melted, the IDS member's processor code extracts data to add to the historical records and, when learning algorithms used, incorporates the data points into the learning algorithm for improving future performance.

Step 10—After the black ice is removed/melted, the IDS member's processor code sends a report to the municipality/county with historical data that can prioritize addressing issues occurring at the black ice zone section. The report can be isolated to only black ice events, or can include other events occurring at the specific zone section.

The steps shown above represent several essential steps; however, some of the steps can be deleted while other steps can be added. Further, the steps do not have to follow the same order and can occur concurrently.

Figure 4:
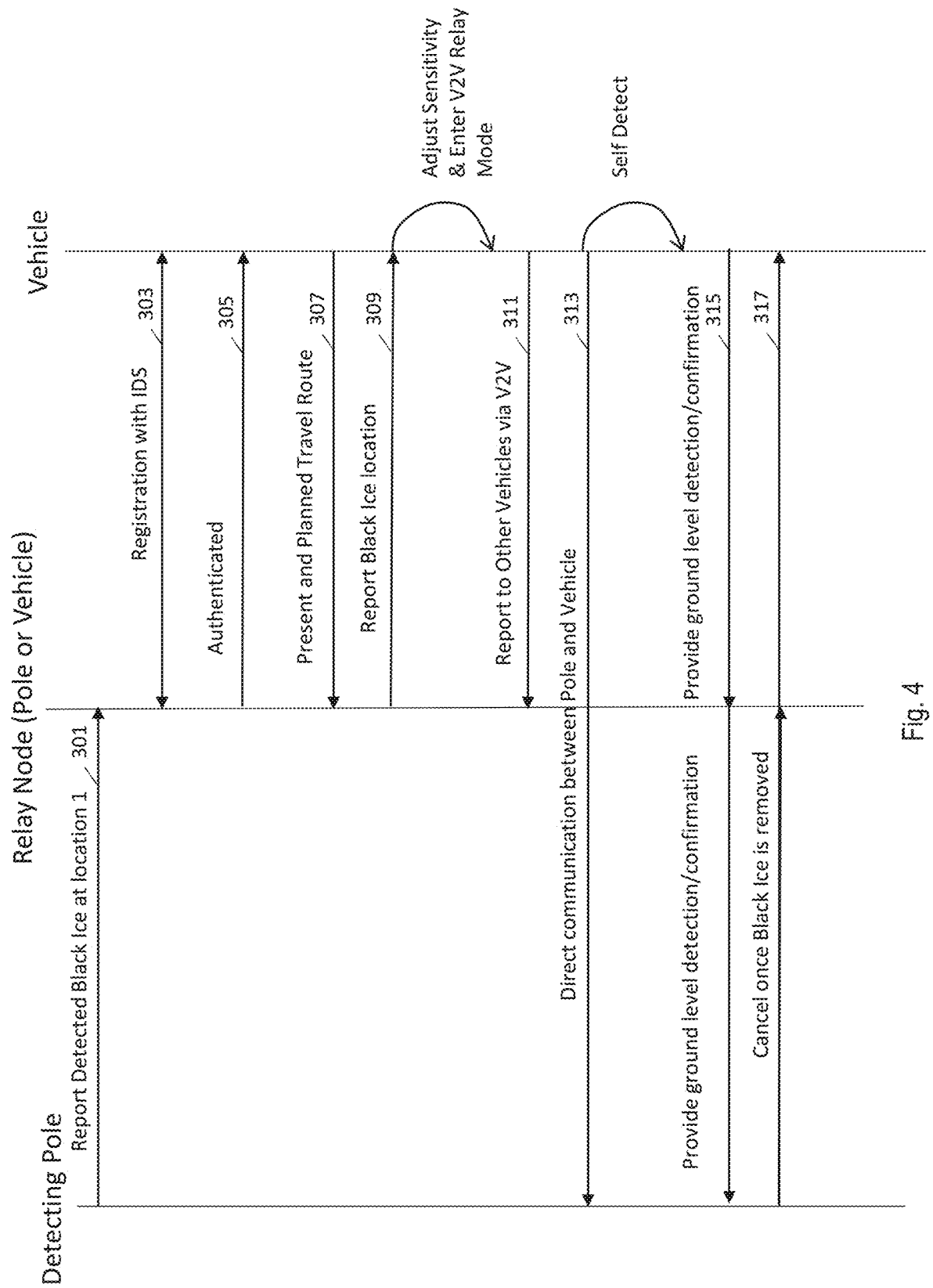
FIG. 4 is a signal diagram of communications between an IDS member hosted on a pole that detects black ice, a relay node, and a vehicle that is approaching the black ice.

FIG. 4 is a signaling diagram between (1) a detecting pole (e.g., a pole that hosts at an IDS member that has detected black ice, or anticipates that black ice will be formed at any moment), (2) a vehicle, and (3) a relay node, which may be another IDS member on a pole, or another vehicle on the road, or a V2X road-side unit (RSU). The RSU may be deployed near the roadway and connected to power from the electrical grid, or it may be more portable and autonomous by receiving its power locally from a battery. In response to the IDS member (hosted on the detecting pole) detecting black ice, the IDS member on the detecting pole dispatches a report 301 to a relay node either through an addressed message or a beacon signal so as to inform the relay node. In this embodiment, the vehicle registers its presence with a signal 303 with an IDS member, which in this embodiment is done directly with the relay node or another vehicle that is ahead of the vehicle. An authentication, or even an ACK, 305 is returned to the vehicle so the vehicle's processor knows it is within the IDS member network. The vehicle then shares its present route, and its planned route in message 307 with the relay node. The relay node then checks for a correspondence with vehicle's travel route and the black ice location, and in response reports any coincidence to the vehicle in a message 309. In reply, the vehicle's processor may take corrective action, such as adjust its sensitivity to self-detection of black ice (previously discussed), adjust a speed, generate a warning, or automatically engage all-wheel drive mode, or anti-lock wheel mode once the vehicle approaches the zone with the black ice. The vehicle may also enter a relay mode itself, and dispatch a warning signal 311 to other vehicles, using V2X signaling, following in its path so the other vehicles are warned of the black ice ahead.

Subsequently, the vehicle may enter a black ice self-detect mode, where itself scans for the presence of black ice in the danger zone and provides update reports in step 313. To enhance detectability, the vehicle may illuminate an undercarriage light to enhance the vehicle's onboard image sensor to detect a change in reflectivity of the road surface, as an indication/confirmation that black ice is present. The information gleaned by the vehicle as is crosses over the black ice, is directly communicated in another signal(s) 315 with one, or both, of the IDS member on the detecting pole and the relay node. The signaling also has an alert cancel signal 317 that informs the vehicle and the relay node if the black ice is determined to have changed back to a liquid or vapor state.

Figure 5:
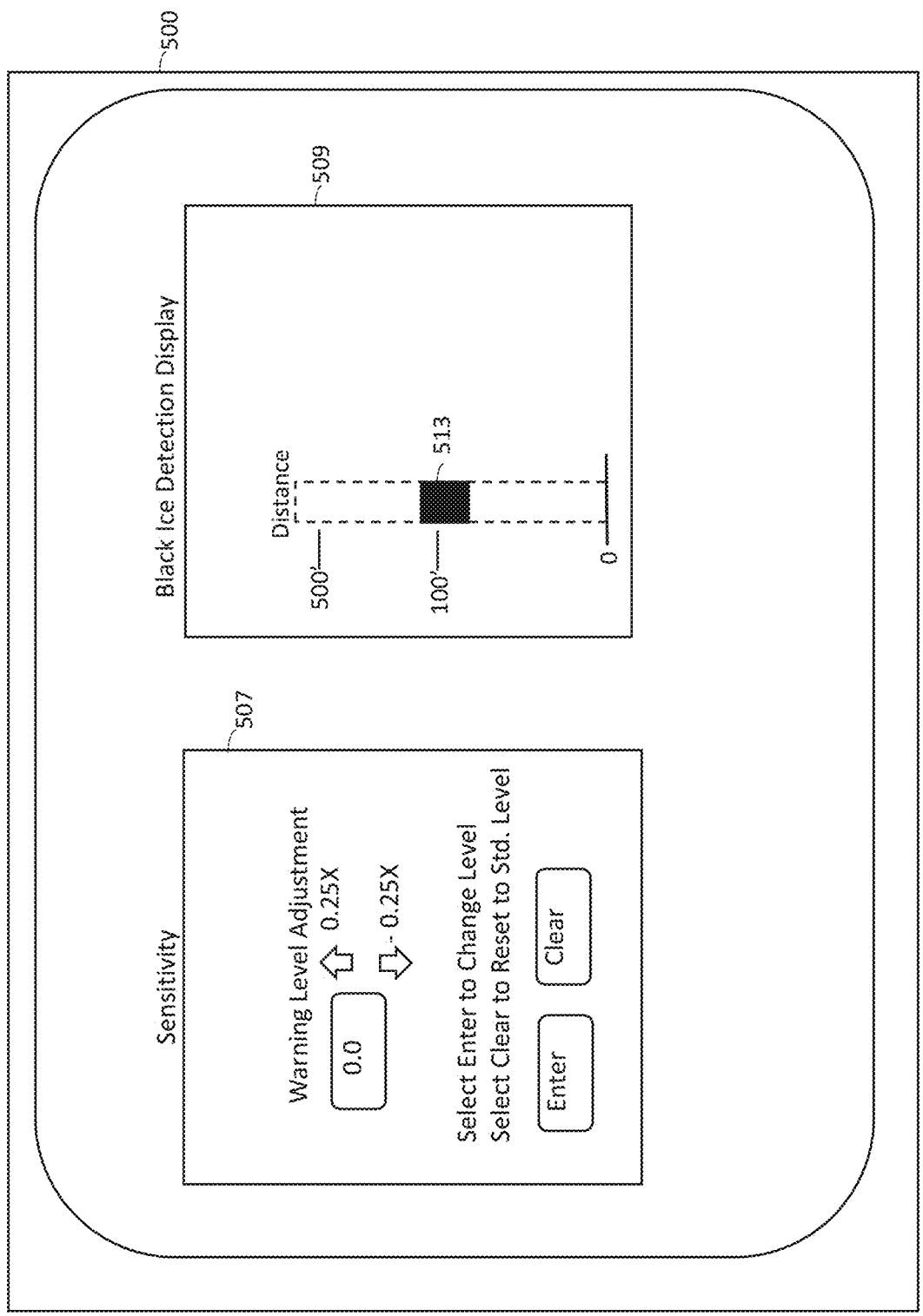
FIG. 5 is a user interface in a vehicle that allows for sensitivity adjustment and visual indication of black ice on a roadway at a specific location.

FIG. 5 is a user interface inside the vehicle. A display 500 includes a first display panel 507, and a second display panel 509. The first display panel includes user-selectable settings that allow for adjustments up or down regarding the sensitivity level of the vehicle's black ice self-detection mode. Each increment of adjustment adjusts the probability of detection by a predetermined amount such as 0.25% (or some other level) so the user has some influence on the false alarm rate for the vehicle's black ice self-detection mode. The right panel 509 provides a visual display of a roadway, and a location on the roadway (icon 513) where the black ice has been detected by other IDS members.

Figure 6:
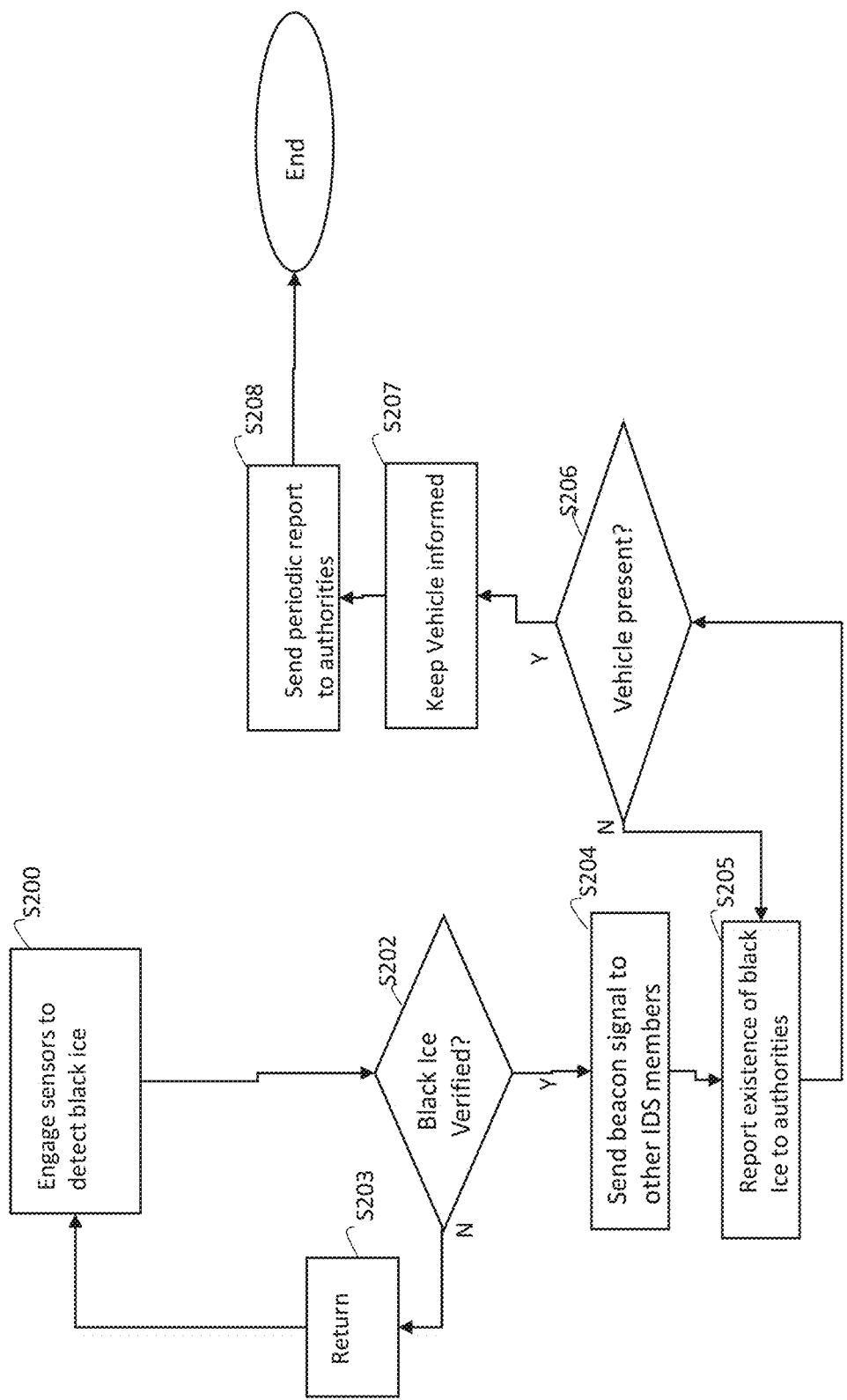
FIG. 6 is flowchart of a process flow performed by a processing circuitry of the IDS member.

FIG. 6 is a flowchart of process performed by a processor of an IDS member that detects a presence of black ice. The process begins in step S200 where the IDS member engages temperature and humidity sensors to determine if black ice is plausible under detected conditions. The sensors also include image sensors that observe changes in reflectivity of the road surface with black ice being detected with a rapid and noticeable increase in reflectivity. In the case of the IDS member being mounted to a streetlight, the streetlight illuminates the roadside surface so the presence of black ice is more noticeable when the reflection angle from the streetlight is closer to orthogonal than when illuminated by headlights of a vehicle, which are oriented to have a more of a glancing angle (e.g., closer to 180 degrees than 90 degrees) off the roadside surface than from an overhead light. The processor may also employ a locally hosted AI engine that has been trained on images from overhead perspectives, or a remotely located AI engine (e.g., hosted on a cloud network, and in communication with the IDS member).

If black ice is not detected in S202 the process returns in S203 to step S200. However, when black ice is detected in S202, the process proceeds to S204 where the IDS member that detects the black ice transmits a beacon signal to other IDS members as well as vehicles and relay nodes. Furthermore, the IDS member reports the existence of the black ice to authorities in S205 so authorities can take municipal or state action by triggering traffic control signals and other visual or auditory warning signals that are directly apparent to an individual (e.g., visual or auditory signals), or via a mobile device in the person's possession, or via the user interface equipment in vehicles. If the IDS member does not detect, in S206, a presence of any local vehicles, the IDS member continues to broadcast a warning beacon. On the other hand, if a vehicle is present, the IDS member establishes direct communications, or communications with a relay node, in S207 until the vehicle is clear of the black ice. Subsequently, after the black ice is no longer detected, the IDS member in S208 provides a comprehensive report to local and/or state authorities so the authorities can accumulate data and detect patterns of where black ice usually form, and thus have a motivation to take corrective action at those locations.

Figure 7:
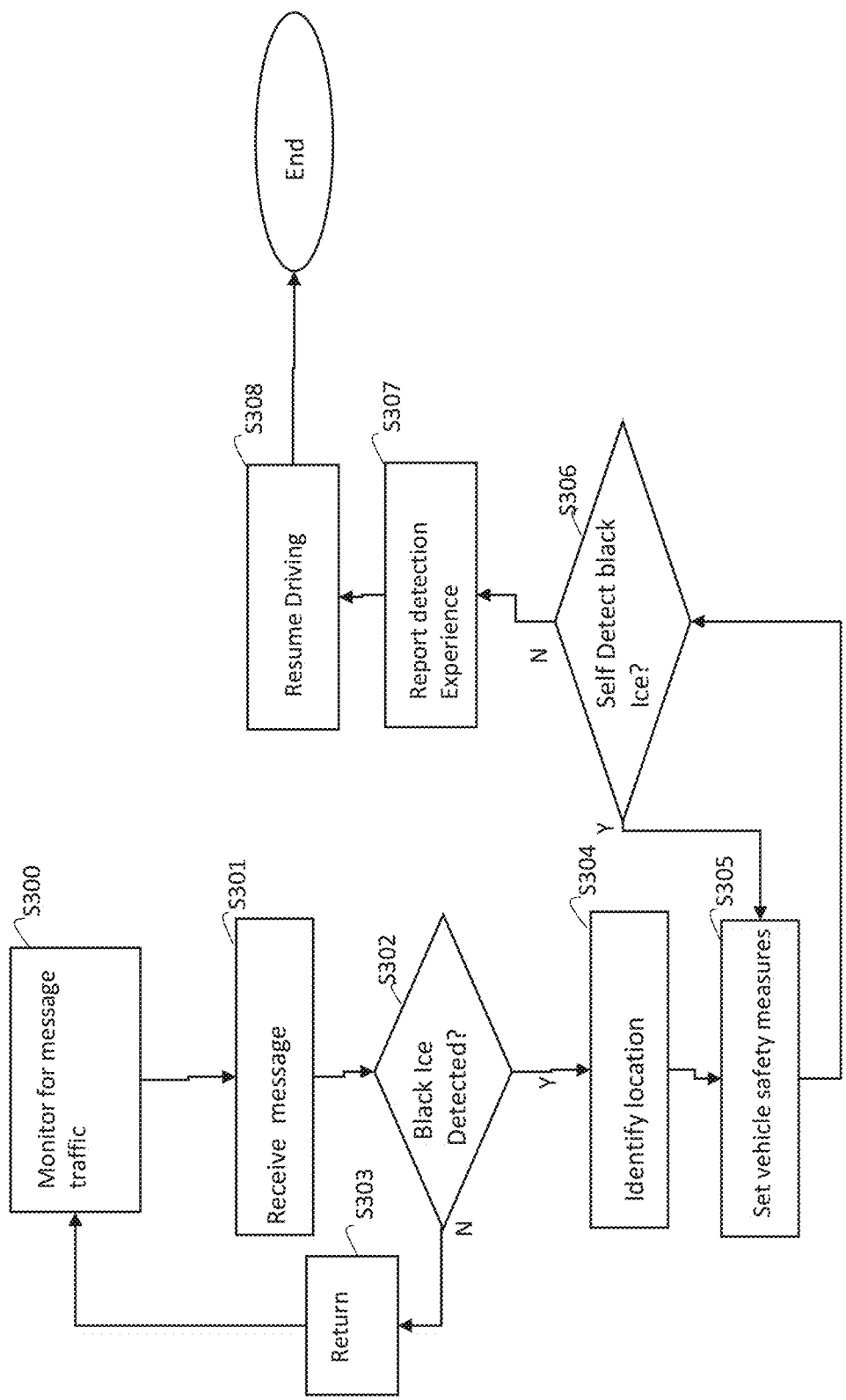
FIG. 7 is flowchart of a process flow performed by a vehicle processor.

FIG. 7 is a flowchart of a process followed by a vehicle's processor when driving in the IDS member network. The process begins in S300 where the vehicle monitors IDS message traffic. The in S301, the vehicle receives a message, and checks in S302 whether the IDS message indicates black ice is nearby. If not, the process returns in S303 to continue monitoring in S300. However, if the received message indicates black ice is detected the vehicle's processor checks in S304 for the location of the black ice, and in S305 engages the vehicle's safety measures (e.g., throttle control, AWD mode, etc.) as well as optional engage a self-detect black ice mode. Then in S306 the processor inquires whether the black ice exists where it was reported to exist, and if so continues the safety measures of S305. However, the if the self-detect mode does not reveal black ice, or the vehicle has passed the black ice, the vehicle reports to the IDS member network its interaction/detection in S307 before resuming driving in S308.

Figure 8:
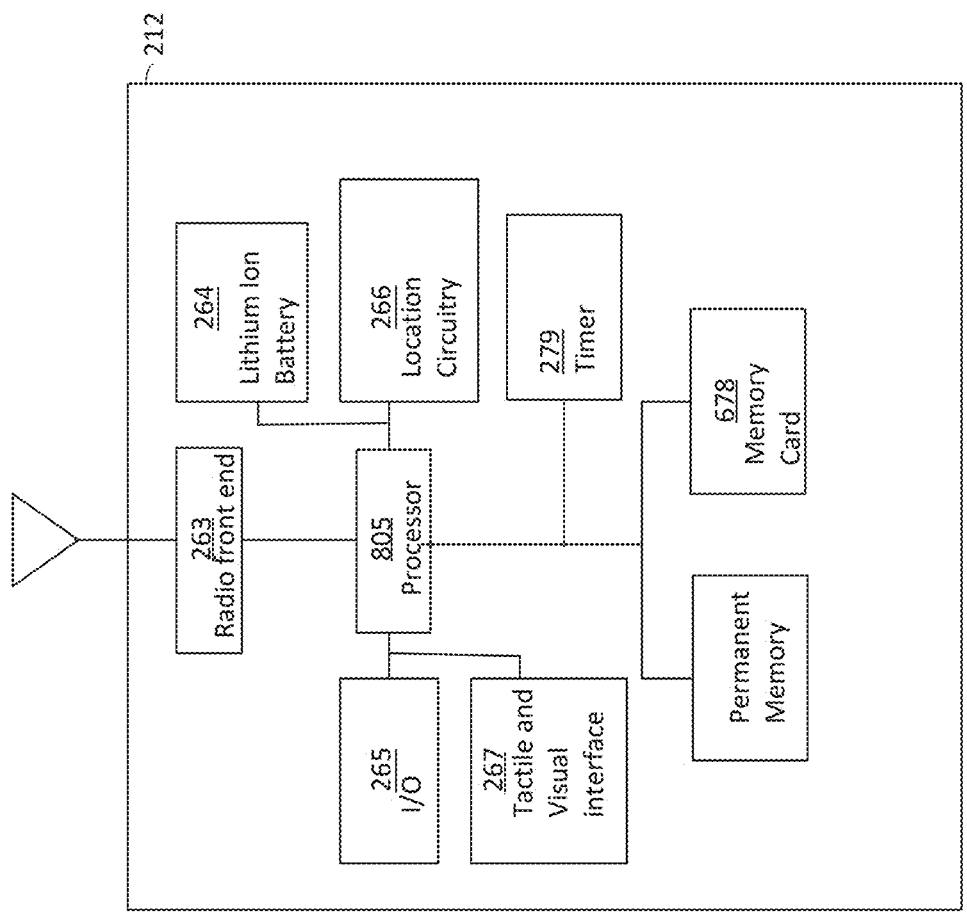
FIG. 8 is a diagram of a radio transceiver employed by any of the IDS member, relay node or vehicle that is approaching the black ice.

FIG. 8 is a block diagram of circuitry used for wireless communications in the vehicles, IDS members, relay nodes, as well as other devices employing RF communications described herein, such as the RSU used in V2X communication with the IDS member and the vehicles. In the example of FIG. 8, the communications in a RSU will be used as a non-limiting example. The RSU includes processor circuitry (e.g., programmed computer) 805, a radio front end 263, an antenna, a tactile and visual interface 267, permanent memory, memory card 678, an optional lithium ion battery 264, timer 279, and location circuitry 266. The RSU may include any sub-combination of the components described above.

Figure 10:
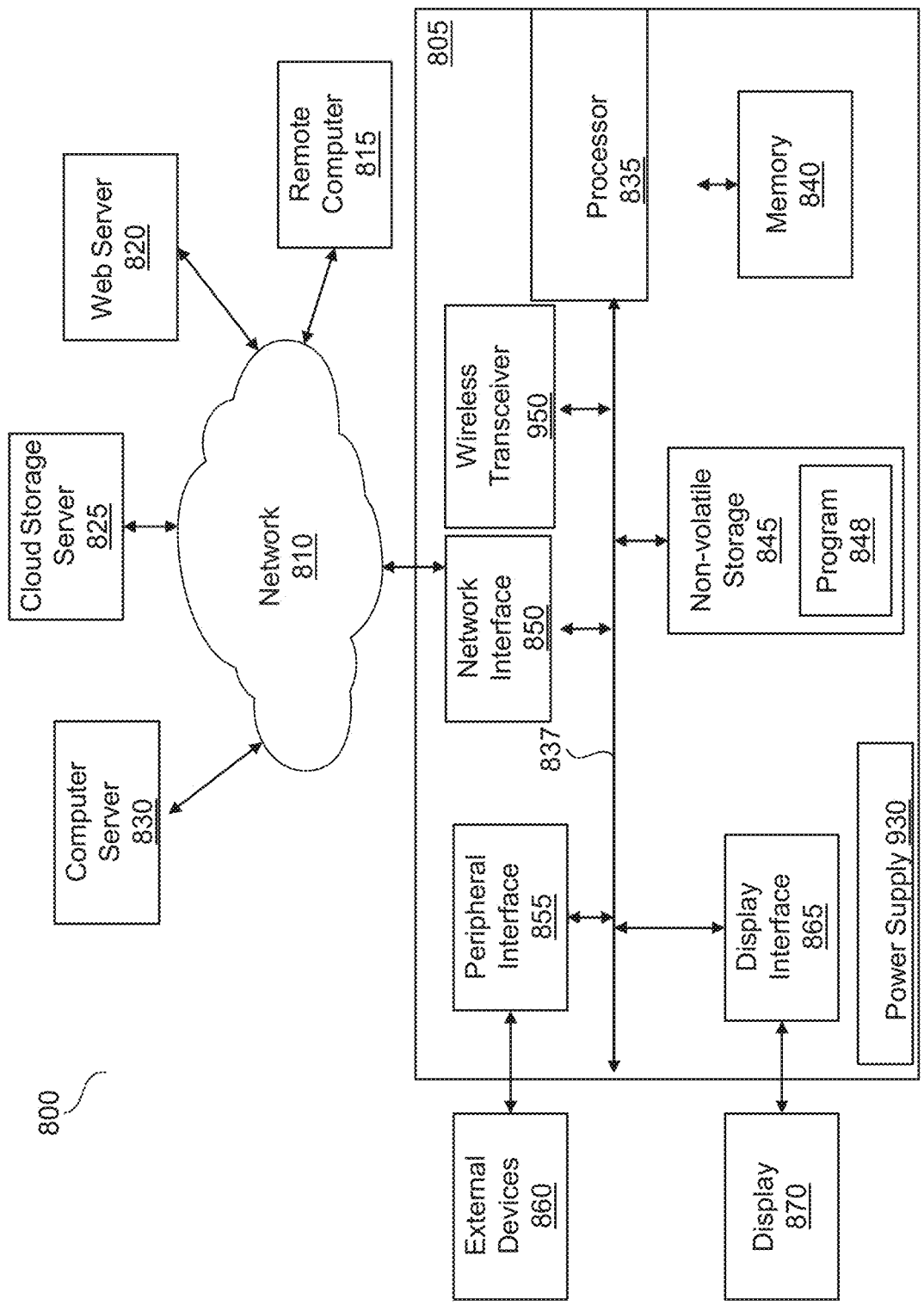
FIG. 10 is diagram of a computer processing system that uses circuitry to control processes described herein.

The processor 805 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like. The processor 805 may perform signal coding, data processing, power control, input/output processing, and/or any other functionality that enables the RSU to operate in a wireless environment, with or without grid power. The processor 805 may be coupled to the radio front end 263, which may be coupled to the antenna 262. While FIG. 10 shows the processor 805 as a separate component, the radio front end may be integrated with the processor 805 they may be integrated into an electronic package or chip.

The antenna 262 may be a whip or a patch antenna, or may be an array of whip and patch antennas along with phase shifting circuitry so as provide gain and perform beam steering. In turn, the beam steering may be advantageous in directing the transmit energy to a nearest neighboring relay node, thereby allowing for the communication link to be closed at great distances.

The radio front end 263 may be configured to modulate the signals that are to be transmitted by the antenna 262 and to demodulate the signals that are received by the antenna 262. The processor 805 of the transceiver 212 may be coupled to, and may receive user input data from, the sensors of the IDS member. The processor 805 may access information from the permanent memory 130 and/or the memory card 678. The permanent memory 130 may include random-access memory (RAM), read-only memory (ROM), a hard disk, or any other type of memory storage device. The memory card 678 may include a subscriber identity module (SIM) card, a memory stick, a secure digital (SD) memory card, and the like. The processor 805 may access information from, and store data in, memory that is not physically located on the RSU.

The processor 805 may receive power from the lithium ion battery 264, or other power source, such as a wired power supply, etc., and may be configured to distribute and/or control the power to the other components in the RSU.

The processor 805 may also be coupled to a GPS location circuitry 136, which provided location information (e.g., longitude and latitude) regarding the current location of the RSU. In addition to the location circuitry 136, the RSU may receive location information via wireless signal 232 from the IDS member.

The timer 279 is a programmable timer that includes a clock. It operates under direction of the processor 805, and serves as a wake-up timer so the RSU (which may be a mobile device and deployed when or where needed) can enter sleep mode, and then be woken up the by the timer at determined times to check temperature. If the temperature is well above freezing, the RSU can enter a sleep cycle until woken again by the timer. The main purpose of the timer is to allow the RSU to remain in a sleep state so as to conserve battery power, and then only wake up occasionally to take temperature measurements, and then operate at freezing or below freezing temperatures.

Figure 9:
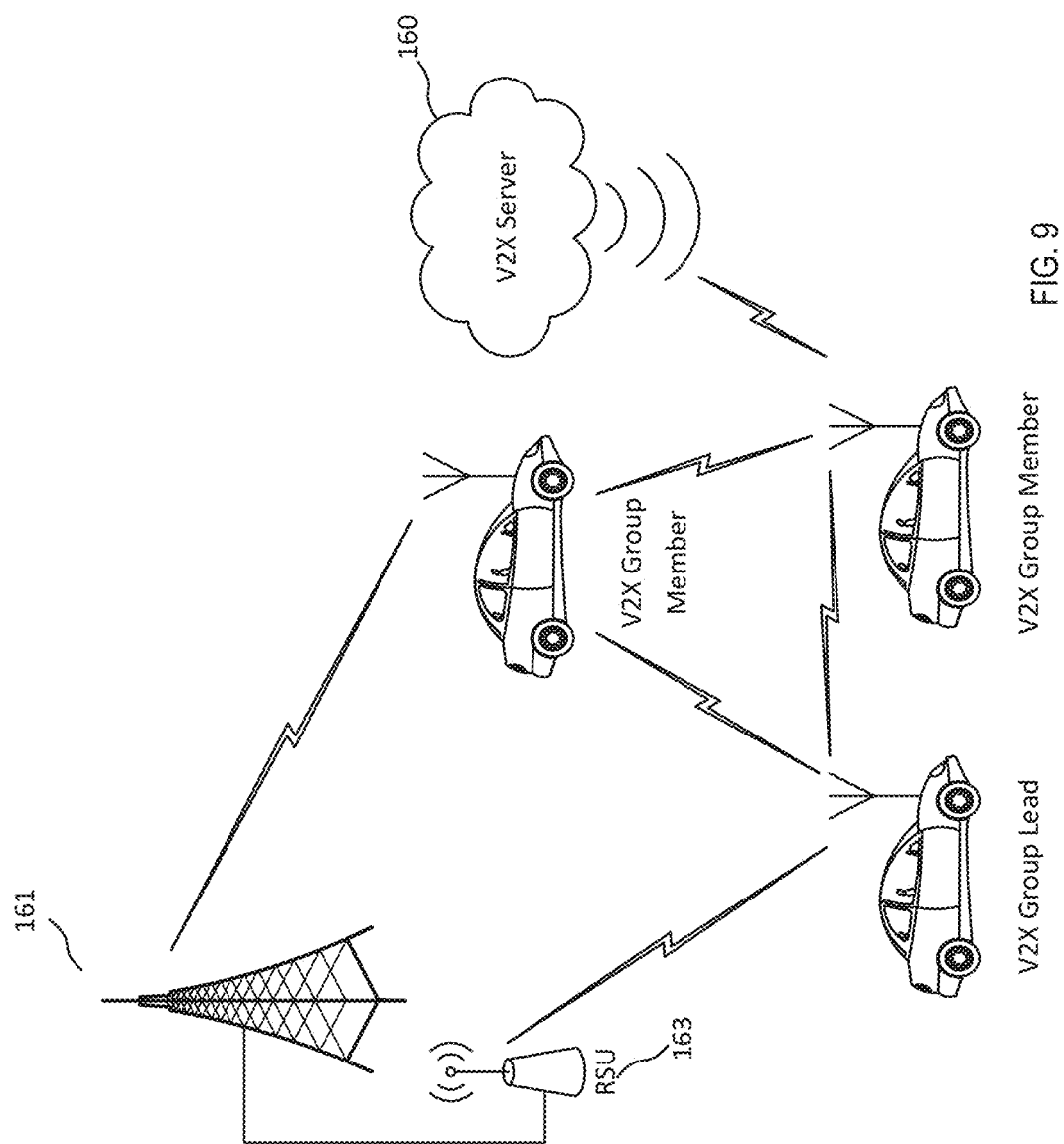
FIG. 9 is a system diagram that shows an example of a processing system used in a communication network that communicates according to a V2V, or more generally V2X, communication standard.

FIG. 9 is a block diagram of an exemplary IDS system in which one or more apparatuses of the IDS network may be used to communicate via V2V or V2X communications. 5G or other wireless communications may be used that support the V2V and V2X communication protocols. For example, as shown in FIG. 9, a gNode B 161 may serve as a base station to service all communication devices within its range. However, some vehicles that are part of a V2X group may not be covered within the cell's territory, but could relay black ice messages via themselves using V2V communications, or via the RSU 163, which is deployable in the field where needed. Furthermore, the vehicles may also communicate directly or via a V2X server 160 that serves as a hub to assist in V2V/V2X communications.

FIG. 10 illustrates a block diagram of a computer that may implement the various embodiments described herein. The present disclosure may be embodied as a system, a method, and/or a computer program product. The computer program product may include a computer readable storage medium on which computer readable program instructions are recorded that may cause one or more processors to carry out aspects of the embodiment.

The computer readable storage medium may be a tangible device that can store instructions for use by an instruction execution device (processor). The computer readable storage medium may be, for example, but is not limited to, an electronic storage device, a magnetic storage device, an optical storage device, an electromagnetic storage device, a semiconductor storage device, or any appropriate combination of these devices. A non-exhaustive list of more specific examples of the computer readable storage medium includes each of the following (and appropriate combinations): flexible disk, hard disk, solid-state drive (SSD), random access memory (RAM), read-only memory (ROM), erasable programmable read-only memory (EPROM or Flash), static random access memory (SRAM), compact disc (CD or CD-ROM), digital versatile disk (DVD) and memory card or stick. A computer readable storage medium, as used in this disclosure, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described in this disclosure can be downloaded to an appropriate computing or processing device from a computer readable storage medium or to an external computer or external storage device via a global network (i.e., the Internet), a local area network, a wide area network and/or a wireless network. The network may include copper transmission wires, optical communication fibers, wireless transmission, routers, firewalls, switches, gateway computers and/or edge servers. A network adapter card or network interface in each computing or processing device may receive computer readable program instructions from the network and forward the computer readable program instructions for storage in a computer readable storage medium within the computing or processing device.

Computer readable program instructions for carrying out operations of the present disclosure may include machine language instructions and/or microcode, which may be compiled or interpreted from source code written in any combination of one or more programming languages, including assembly language, Basic, Fortran, Java, Python, R, C, C++, C# or similar programming languages. The computer readable program instructions may execute entirely on a user's personal computer, notebook computer, tablet, or smartphone, entirely on a remote computer or computer server, or any combination of these computing devices. The remote computer or computer server may be connected to the user's device or devices through a computer network, including a local area network or a wide area network, or a global network (i.e., the Internet). In some embodiments, electronic circuitry including, for example, programmable logic circuitry, field-programmable gate arrays (FPGA), or programmable logic arrays (PLA) may execute the computer readable program instructions by using information from the computer readable program instructions to configure or customize the electronic circuitry, in order to perform aspects of the present disclosure.

Aspects of the present disclosure are described herein with reference to flow diagrams and block diagrams of methods, apparatus (systems), and computer program products according to embodiments of the disclosure. It will be understood by those skilled in the art that each block of the flow diagrams and block diagrams, and combinations of blocks in the flow diagrams and block diagrams, can be implemented by computer readable program instructions.

The computer readable program instructions that may implement the systems and methods described in this disclosure may be provided to one or more processors (and/or one or more cores within a processor) of a general purpose computer, special purpose computer, or other programmable apparatus to produce a machine, such that the instructions, which execute via the processor of the computer or other programmable apparatus, create a system for implementing the functions specified in the flow diagrams and block diagrams in the present disclosure. These computer readable program instructions may also be stored in a computer readable storage medium that can direct a computer, a programmable apparatus, and/or other devices to function in a particular manner, such that the computer readable storage medium having stored instructions is an article of manufacture including instructions which implement aspects of the functions specified in the flow diagrams and block diagrams in the present disclosure.

The computer readable program instructions may also be loaded onto a computer, other programmable apparatus, or other device to cause a series of operational steps to be performed on the computer, other programmable apparatus, or other device to produce a computer implemented process, such that the instructions which execute on the computer, other programmable apparatus, or other device implement the functions specified in the flow diagrams and block diagrams in the present disclosure.

FIG. 10 is a functional block diagram illustrating a networked system 800 of one or more networked computers and servers. In an embodiment, the hardware and software environment illustrated in FIG. 10 may provide an exemplary platform for implementation of the software and/or methods according to the present disclosure.

Referring to FIG. 10, a networked system 800 may include, but is not limited to, computer 805, network 810, remote computer 815, web server 820, cloud storage server 825 and computer server 830. In some embodiments, multiple instances of one or more of the functional blocks illustrated in FIG. 10 may be employed.

Additional detail of computer 805 is shown in FIG. 10. The functional blocks illustrated within computer 805 are provided only to establish exemplary functionality and are not intended to be exhaustive. And while details are not provided for remote computer 815, web server 820, cloud storage server 825 and computer server 830, these other computers and devices may include similar functionality to that shown for computer 805.

Computer 805 may be a personal computer (PC), a desktop computer, laptop computer, tablet computer, netbook computer, a personal digital assistant (PDA), a smart phone, or any other programmable electronic device capable of communicating with other devices on network 810.

Computer 805 may include processor 835, bus 837, memory 840, non-volatile storage 845, network interface 850, peripheral interface 855 and display interface 865. Each of these functions may be implemented, in some embodiments, as individual electronic subsystems (integrated circuit chip or combination of chips and associated devices), or, in other embodiments, some combination of functions may be implemented on a single chip (sometimes called a system on chip or SoC).

Processor 835 may be one or more single or multi-chip microprocessors, such as those designed and/or manufactured by Intel Corporation, Advanced Micro Devices, Inc. (AMD), Arm Holdings (Arm), Apple Computer, etc. Examples of microprocessors include Celeron, Pentium, Core i3, Core i5 and Core i7 from Intel Corporation; Opteron, Phenom, Athlon, Turion and Ryzen from AMD; and Cortex-A, Cortex-R and Cortex-M from Arm.

Bus 837 may be a proprietary or industry standard high-speed parallel or serial peripheral interconnect bus, such as ISA, PCI, PCI Express (PCI-e), AGP, and the like.

Memory 840 and non-volatile storage 845 may be computer-readable storage media. Memory 840 may include any suitable volatile storage devices such as Dynamic Random Access Memory (DRAM) and Static Random Access Memory (SRAM). Non-volatile storage 845 may include one or more of the following: flexible disk, hard disk, solid-state drive (SSD), read-only memory (ROM), erasable programmable read-only memory (EPROM or Flash), compact disc (CD or CD-ROM), digital versatile disk (DVD) and memory card or stick.

Program 848 may be a collection of machine readable instructions and/or data that is stored in non-volatile storage 845 and is used to create, manage and control certain software functions that are discussed in detail elsewhere in the present disclosure and illustrated in the drawings. In some embodiments, memory 840 may be considerably faster than non-volatile storage 845. In such embodiments, program 848 may be transferred from non-volatile storage 845 to memory 840 prior to execution by processor 835.

Computer 805 may be capable of communicating and interacting with other computers via network 810 through network interface 850. Network 810 may be, for example, a local area network (LAN), a wide area network (WAN) such as the Internet, or a combination of the two, and may include wired, wireless, or fiber optic connections. In general, network 810 can be any combination of connections and protocols that support communications between two or more computers and related devices.

Peripheral interface 855 may allow for input and output of data with other devices that may be connected locally with computer 805. For example, peripheral interface 855 may provide a connection to external devices 860. External devices 860 may include devices such as a keyboard, a mouse, a keypad, a touch screen, and/or other suitable input devices. External devices 860 may also include portable computer-readable storage media such as, for example, thumb drives, portable optical or magnetic disks, and memory cards. Software and data used to practice embodiments of the present disclosure, for example, program 848, may be stored on such portable computer-readable storage media. In such embodiments, software may be loaded onto non-volatile storage 845 or, alternatively, directly into memory 840 via peripheral interface 855. Peripheral interface 855 may use an industry standard connection, such as RS-232 or Universal Serial Bus (USB), to connect with external devices 860.

Display interface 865 may connect computer 805 to display 870. Display 870 may be used, in some embodiments, to present a command line or graphical user interface to a user of computer 805. Display interface 865 may connect to display 870 using one or more proprietary or industry standard connections, such as VGA, DVI, DisplayPort and HDMI.

As described above, network interface 850, provides for communications with other computing and storage systems or devices external to computer 805. Software programs and data discussed herein may be downloaded from, for example, remote computer 815, web server 820, cloud storage server 825 and computer server 830 to non-volatile storage 845 through network interface 850 and network 810. Furthermore, the systems and methods described in this disclosure may be executed by one or more computers connected to computer 805 through network interface 850 and network 810. For example, in some embodiments the systems and methods described in this disclosure may be executed by remote computer 815, computer server 830, or a combination of the interconnected computers on network 810.

Data, datasets and/or databases employed in embodiments of the systems and methods described in this disclosure may be stored and or downloaded from remote computer 815, web server 820, cloud storage server 825 and computer server 830.

Circuitry as used in the present application can be defined as one or more of the following: an electronic component (such as a semiconductor device), multiple electronic components that are directly connected to one another or interconnected via electronic communications, a computer, a network of computer devices, a remote computer, a web server, a cloud storage server, a computer server. For example, each of the one or more of the computer, the remote computer, the web server, the cloud storage server, and the computer server can be encompassed by or may include the circuitry as a component(s) thereof. In some embodiments, multiple instances of one or more of these components may be employed, wherein each of the multiple instances of the one or more of these components are also encompassed by or include circuitry. In some embodiments, the circuitry represented by the networked system may include a serverless computing system corresponding to a virtualized set of hardware resources. The circuitry represented by the computer may be a personal computer (PC), a desktop computer, a laptop computer, a tablet computer, a netbook computer, a personal digital assistant (PDA), a smart phone, or any other programmable electronic device capable of communicating with other devices on the network. The circuitry may be a general purpose computer, special purpose computer, or other programmable apparatus as described herein that includes one or more processors. Each processor may be one or more single or multi-chip microprocessors. Processors are considered processing circuitry or circuitry as they include transistors and other circuitry therein. The circuitry may implement the systems and methods described in this disclosure based on computer-readable program instructions provided to the one or more processors (and/or one or more cores within a processor) of one or more of the general purpose computer, special purpose computer, or other programmable apparatus described herein to produce a machine, such that the instructions, which execute via the one or more processors of the programmable apparatus that is encompassed by or includes the circuitry, create a system for implementing the functions specified in the flow diagrams and block diagrams in the present disclosure. Alternatively, the circuitry may be a preprogrammed structure, such as a programmable logic device, application specific integrated circuit, or the like, and is/are considered circuitry regardless if used in isolation or in combination with other circuitry that is programmable, or pre-programmed.

Figure 11:
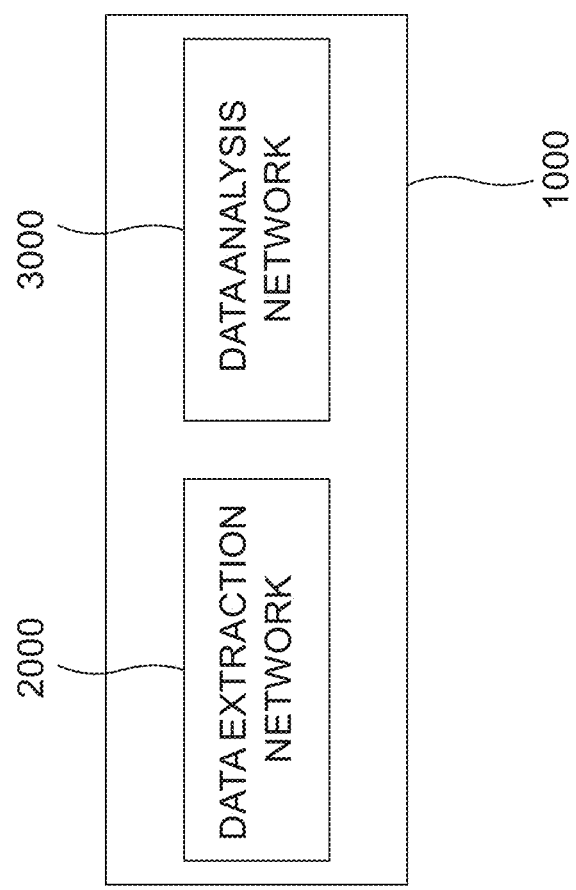
FIG. 11 is a block diagram of a computing device that includes a data extraction network and a data analysis network that provide an artificial intelligence (AI) engine for estimating presence or expected emergence of black ice on a pathway.
Figure 12:
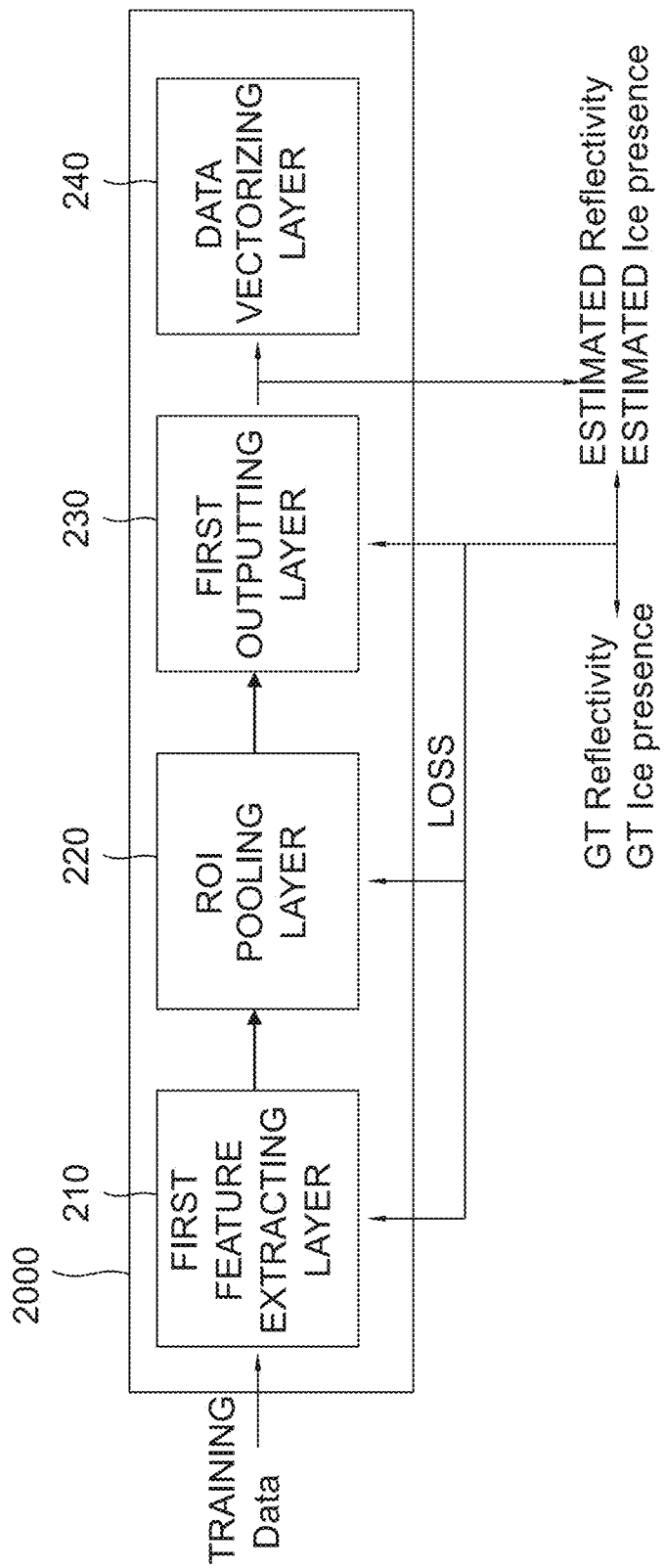
FIG. 12 is a more detailed description of the data extraction network of FIG. 11.

The IDS member may employ a trained AI engine to assist in detecting black ice formation, and assist in predicting when ice will become present based on emerging environmental factors. As shown in FIG. 11, a computing device 1000 may include a data extraction network 2000 and a data analysis network 3000. Further, as illustrated in FIG. 12, the data extraction network may include at least one first feature extracting layer 210, at least one Region-Of-Interest (ROI) pooling layer 220, at least one first outputting layer 230 and at least one data vectorizing layer 240. And, also to be illustrated in FIG. 13, the data analysis network 3000 may include at least one second feature extracting layer 310 and at least one second outputting layer 320.

First, the computing device 1000 is trained on images and sensor information provided to it by the sensors and camera (s) of the IDS member. After a subject image is acquired, in order to generate a source vector to be inputted to the data analysis network 3000, the computing device 1000 may instruct the data extraction network 2000 to generate the source vector including (i) a reflectivity of the roadway's surface, and (ii) an estimated presence of black ice on the road surface.

In order to generate the source vector, the computing device 1000 may instruct at least part of the data extraction network 2000 to detect reflectivity and black ice presence from the image data from the IDS member.

Specifically, the computing device 1000 may instruct the first feature extracting layer 210 to apply at least one first convolutional operation to the subject image and sensor data, to thereby generate at least one subject feature map. Thereafter, the computing device 1000 may instruct the ROI pooling layer 220 to generate one or more ROI-Pooled feature maps by pooling regions on the subject feature map and/or sensor data, corresponding to ROIs on the subject image, and/or senor data file which have been acquired from a Region Proposal Network (RPN) interworking with the data extraction network 2000. And, the computing device 1000 may instruct the first outputting layer 230 to generate at least one estimated reflectivity. That is, the first outputting layer 230 may perform a classification and a regression on the subject image and sensor file, by applying at least one first Fully-Connected (FC) operation to the ROI-Pooled feature maps, to generate each of reflectivity and black ice formation detection, including information on coordinates of each of bounding boxes on a specific area around particular roadway (or pathway) regions that are traversed by vehicles or pedestrians.

After such detecting processes are completed, by using the estimated reflectivity and black ice formation detection, the computing device 1000 may instruct the data vectorizing layer 240 to subtract a y-axis coordinate of an upper bound of the ground from a y-axis coordinate of the lower boundary of the region surrounding probe to generate the apparent reflectivity and ice detection associated with the content sensor file from region of the roadway, and multiply the detected value with an estimated area to generate the apparent reflectivity and black ice presence for that area.

After the apparent reflectivity and black ice formation for the area is acquired, the computing device 1000 may instruct the data vectorizing layer 240 to generate at least one source vector including the reflectivity and estimated ice presence as its at least part of components.

Then, the computing device 1000 may instruct the data analysis network 3000 to calculate an estimated ice presence by using the source vector. Herein, the second feature extracting layer 310 of the data analysis network 3000 may apply second convolutional operation to the source vector to generate at least one source feature map, and the second outputting layer 320 of the data analysis network 3000 may perform a regression, by applying at least one FC operation to the source feature map, to thereby calculate the estimated ice presence.

As shown above, the computing device 1000 may include two neural networks, i.e., the data extraction network 2000 and the data analysis network 3000. The two neural networks should be trained to perform said processes properly. Below, how to train the two neural networks will be explained by referring to FIG. 12 and FIG. 13.

First, by referring to FIG. 12, the data extraction network 2000 may have been trained by using (i) a plurality of training images and sensor measurements corresponding to road zones for training, photographed from above the road zones by the IDS members, and (ii) a plurality of their corresponding GT Ice reflectivity and ice detections. More specifically, the data extraction network 2000 may have applied aforementioned operations to the training images and sensor files, and have generated their corresponding estimated regions and estimated reflectivity and ice presence amounts. Then, (i) each of ground pairs of each of the estimated regions and each of their corresponding GT ground regions and (ii) each of regions and sensor reading pairs of each of the estimated regions, in order to generate at least one reflectivity total loss and at least one ice presence loss, by using any of loss generating algorithms, e.g., a smooth-L1 loss algorithm and a cross-entropy loss algorithm. Thereafter, by referring to the reflectivity total loss and black ice presence loss, backpropagation may have been performed to learn at least part of parameters of the data extraction network 2000. Parameters of the RPN can be trained also, but a usage of the RPN is a well-known prior art, thus further explanation is omitted.

Herein, the data vectorizing layer 240 may have been implemented by using a rule-based algorithm, not a neural network algorithm. In this case, the data vectorizing layer 240 may not need to be trained, and may just be able to perform properly by using its settings inputted by a manager.

As an example, the first feature extracting layer 210, the ROI pooling layer 220 and the first outputting layer 230 may be acquired by applying a transfer learning, which is a well-known prior art, to an existing object detection network such as VGG or ResNet, etc.

Figure 13:
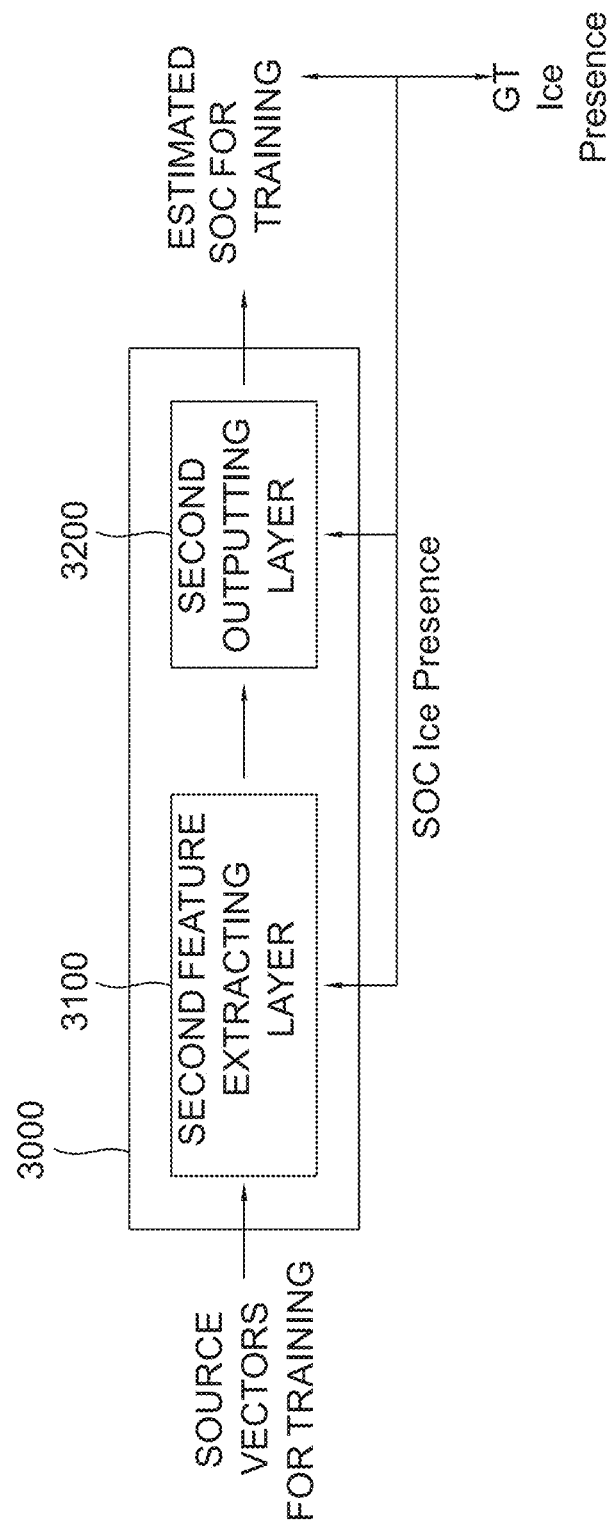
FIG. 13 is a more detailed description of the data analysis network of FIG. 11.

Second, by referring to FIG. 13, the data analysis network 3000 may have been trained by using (i) a plurality of source vectors for training, including apparent black ice conditions and sensor readings for training as their components, and (ii) a plurality of their corresponding GT ice detection confidences. More specifically, the data analysis network 3000 may have applied aforementioned operations to the source vectors for training, to thereby calculate their corresponding estimated total ice thickness levels for training. Then each of roadway region and ice detection levels pairs of each of the estimated regions and each of their corresponding GT regions may have been referred to, in order to generate at least one black ice detection, by using said any of loss algorithms. Thereafter, by referring to the ice detection loss, backpropagation can be performed to learn at least part of parameters of the data analysis network 3000.

After performing such training processes, the computing device 1000 can properly calculate the estimated ice presence detection level by using the subject image including the scene photographed from the IDS member and from sensor levels.

Obviously, numerous modifications and variations of the present disclosure are possible in light of the above teachings. It is therefore to be understood that within the scope of the appended claims, the disclosure may be practiced otherwise than as specifically described herein.

| List of Elements | |
|---|---|
| 1 | Black Ice |
| 2 | Pole |
| 3 | Roadway, Pathway |
| 4 | Traffic Light Pole |
| 5 | Roadway Light Pole |
| 6 | Sidewalk |
| 7 | Intersection |
| 8 | Audio Device |
| 9 | Signaling Device |
| 10 | IDS Member |
| 11 | Zone Section |
| 12 | Crosswalk |
| 13 | Light Source |
| 15 | IDS Member Housing |
| 18 | Sensing Device |
| 60 | Camera, Image Sensor |
| 210 | First FE Layer |
| 212, 950 | Transceiver |
| 220 | ROI Pooling Layer |
| 230 | First Output Layer |
| 240 | Data Vectorization Layer |
| 263 | Radio Front End |
| 264 | Battery |
| 265 | Input/Output Interface |
| 266 | Location Circuitry |
| 267 | Interface |
| 279 | Timer |
| 500, 870 | Display |
| 507, 509 | Display panel |
| 678 | Memory Card |
| 800, 805, 835, 1000 | Computer, Processor Circuitry |
| 810 | Network |
| 815 | Remote Computer |
| 820, 825, 830 | Server |
| 837 | Bus |
| 840, 845 | Memory |
| 848 | Program, Code |
| 850, 855, 865 | Interface |
| 860 | External Devices |
| 930 | Power Supply |
| 2000 | Data Extraction Network |
| 3000 | Data Analysis Network |
| 3100 | Second FE Layer |
| 3200 | Second Outputting Layer |

The invention claimed is:

1. A network comprising:
a plurality of intermediate device system (IDS) members, each IDS member coupled to a respective pole structure that electrically connects to a power source, each IDS member comprising
a local input interface,
a sensor configured to sense a parameter of an environmental condition of an area proximate to an IDS member that comprising a detection IDS member, the sensor comprising a camera, wherein
an optical field of view of the camera includes a predetermined region of a pathway, the optical field of view overlaps another optical field of view of a neighboring IDS member, and
an image sensor that captures optical information of the predetermined region of the pathway,
a pole mounted housing that contains therein
processing circuitry configured to receive the parameter of the environmental condition from the sensor and the optical information, and
a non-transitory computer readable memory that has code stored therein that upon execution of the code by the processing circuitry causes the processing circuitry to implement an AI engine that is trained to, upon receipt of the optical information and the parameter of the environmental condition, detect an existence of black ice or a time at which black ice estimated to form on a portion of the predetermined region of the pathway having the black ice or on which the black ice is estimated to form, and output a status indication of black ice, and
a wireless transceiver configured to transmit a wireless message that includes a real-time alert to a remote receiver, the wireless message including the status indication of the black ice and information about a location of the black ice on the portion of the predetermined region of the pathway, wherein
the remote receiver is hosted in at least one of a vehicle, a mobile device of a pedestrian, a neighboring IDS member, a road-side device that provides a wireless relay function, or a municipal/county facility.

2. The network of claim 1, wherein at least one IDS member of the plurality of IDS members configured to map the location of the black ice on the pathway and send the mapped location to the remote receiver.

3. The network of claim 1, further comprising:
a transceiver comprising the remote receiver the transceiver hosted in one of the vehicle and the mobile device of the pedestrian, and
upon receipt of a reply message from the transceiver of the remote receiver that informs the detection IDS member of a planned travel path of the remote receiver, the detection IDS member transmits another signal to another device along the planned travel path and closer to the remote receiver than the detection IDS member so as to trigger the another device to generate a visual and/or an audio alert.

4. The network of claim 1, wherein a location of the remote receiver being in a municipal and/or a county facility.

5. The network of claim 4, wherein
the processing circuitry configured to implement an event counter with a weighted algorithm that prioritizes an alert report with at least one parameter showing a traffic load at the portion of the portion of the predetermined region of the pathway having the black ice or on which the black ice estimated to form.

6. The network of claim 5, wherein the alert report includes at least one image taken by the camera, the camera having a filter.

7. The network of claim 1, wherein the wireless message comprising a V2X signal generated by the IDS detection member and the remote receiver hosted in the vehicle, the V2X signal transmitted at a time of reception by the vehicle as the vehicle passes the portion of the predetermined region of the pathway having the black ice or on which the black ice estimated to form.

8. The network of claim 1, wherein the wireless message comprising a V2X signal generated by the IDS detection member and the remote receiver hosted in the vehicle, the V2X signal transmitted at a time of reception by the vehicle as the vehicle approaches the portion of the predetermined region of the pathway having the black ice or on which the black ice estimated to form.

9. The network of claim 1, wherein the detection IDS member further comprises a secondary thermal probe that monitors an ambient temperature in the area proximate to the detection IDS member.

10. The network of claim 9, wherein real time input from the camera and/or the secondary thermal probe analyzed by the AI engine pre-emptively detects and triggers generation of a black ice alert prior to an icing event.

11. A network comprising:
a plurality of intermediate device system (IDS) members, wherein each IDS member coupled to a pole structure electrically connected to a power source, and an IDS detection member of the plurality of IDS members comprising:
a pole mounted housing, the pole mounted housing sized to host and retain therein
a local input device,
a resident memory that stores AI code that upon execution by a processor implements an AI engine trained to detect black ice,
the processor,
an output device,
a transceiver, and
a communicatively coupled auxiliary sensing device that senses an environmental parameter of an area surrounding the IDS detection member,
a controller communicatively coupled to the processor and a vehicle, wherein
the auxiliary sensing device comprising at least one camera, a field of vision of the camera covers a defined portion of a road and overlap with a field of vision of a neighboring IDS member, the camera has at least one filter configured to detect an environmentally adverse roadway condition, input received from the camera by the processor analyzed by code programmed to identify a presence of black ice on a portion of the roadway, and under a condition black ice detected or the AI engine determines an imminent presence of black ice, the transceiver of the IDS detection member dispatches in in real time an alert by at least one of an electronic signal, an audio signal or a visual signal so as to warn the vehicle and/or pedestrian traveling toward the portion of the roadway having the black ice from a plurality of directions.

12. The network of claim 11, further comprising a light emitting signal coupled to at least one pole along a path of travel of the vehicle and/or pedestrian se as to alert the vehicle and/or pedestrian of a black icing presence further ahead of the path of travel.

13. The network of claim 11, wherein the IDS detection member is configured to generate a map that defines an outer boundary of the portion of the roadway on which the black ice is present.

14. The network of claim 11, wherein the IDS detection member further comprising at least one sensing device that, in addition to the camera, provides real time inputs to the processor in determining environmental conditions that give rise to a black ice event.

15. The network of claim 11, wherein the AI engine is trained to learn spectral characteristics of an environment proximate to the IDS detection member, and the spectral characteristics are separated by at least one of: time of day and season of the year.

16. The network of claim 15, wherein the AI engine is trained to learn and adapt to changes in spectral light distribution reflected from a vehicular and/or a pedestrian path of travel over time.

17. The network of claim 11, wherein the IDS detection member nearest an icing event location comprising a primary alerting entity of the plurality of IDS members.

18. The network of claim 11, wherein the transceiver of the IDS detection member employs a plurality of communication protocols to communicate alerts to vehicles and remote clients.

19. The network of claim 11, wherein the transceiver is configured to generate a V2X signal containing at least one operational parameter used to control a vehicle as the vehicle approaches the portion of the roadway where black ice detected.

20. The method of detecting black ice on a pathway and alerting a remote receiver of the black ice, comprising:
coupling intermediate device system (IDS) members to respective pole structures, each pole structure being electrically connected to a power source;
sensing with a sensor of a detection IDS member a parameter of an environmental condition of an area proximate to the detection IDS member, the sensor comprising a camera, wherein the camera has an optical field of view that includes a predetermined region of a pathway, the optical field of view overlaps another optical field of view of a neighboring IDS member;
capturing with an image sensor of the camera optical information of the predetermined region of the pathway;
receiving at processing circuitry the parameter of the environmental condition from the sensor and the optical information, and
executing code by the processing circuitry to implement an AI engine trained to, upon receipt of the optical information and the parameter of the environmental condition, detect an existence of black ice or a time at which black ice estimated to form on a portion of the predetermined region of the pathway having the black ice or on which the black ice estimated to form, the executing including detecting the indication of black ice and outputting a status indication of black ice;
transmitting from a wireless transceiver a wireless message that includes a real-time alert to a remote receiver, the wireless message including the status indication of the black ice and information about a location of the black ice on the portion of the predetermined region of the pathway,
receiving at the remote receiver the status indication; and
controlling an operation of at least one of
a vehicle in which the remote receiver is located to adjust an operation of the vehicle to reduce a risk of a traffic accident caused by the black ice,
a mobile device of a pedestrian to alert the pedestrian of the black ice,
a neighboring IDS member or a road-side device to trigger the neighboring IDS member to generate and transmit a relay message,
a computer at a municipal/county facility to generate an alert message.

* * * * *